US011286987B2

(12) United States Patent
Calatraba et al.

(10) Patent No.: US 11,286,987 B2
(45) Date of Patent: Mar. 29, 2022

(54) BEARING CAGE, ASSOCIATED ASSEMBLY AND ASSOCIATED MOUNTING AND DISMANTLING METHODS

(71) Applicant: NTN-SNR Roulements, Annecy (FR)

(72) Inventors: David Calatraba, Silingy (FR); Guillaume Lefort, Annecy (FR); Cyprien Teillou, Annecy (FR); Aurélien Bonnaudet, Annecy (FR); Ivan Goudet, Chambery (FR); Vincent Pallanchard, Annecy (FR)

(73) Assignee: NTN-SNR ROULEMENTS, Annecy (FR)

( * ) Notice: Subject to any disclaimer, the term of this patent is extended or adjusted under 35 U.S.C. 154(b) by 0 days.

(21) Appl. No.: 16/919,865

(22) Filed: Jul. 2, 2020

(65) Prior Publication Data
US 2021/0003173 A1    Jan. 7, 2021

(30) Foreign Application Priority Data

Jul. 3, 2019   (FR) ...................................... 1907413
Dec. 10, 2019  (FR) ...................................... 1914102

(51) Int. Cl.
*F16C 33/41*     (2006.01)
*F16C 43/06*     (2006.01)
(Continued)

(52) U.S. Cl.
CPC .............. *F16C 33/38* (2013.01); *F16C 19/06* (2013.01); *F16C 19/548* (2013.01);
(Continued)

(58) Field of Classification Search
CPC ...... F16C 19/06; F16C 19/184; F16C 19/548; F16C 19/497; F16C 33/3887; F16C 33/405; F16C 33/41; F16C 33/412; F16C 33/414; F16C 33/416; F16C 33/418; F16C 33/43; F16C 33/06; F16C 33/065; F16C 33/083;
(Continued)

(56) References Cited

U.S. PATENT DOCUMENTS 8,061,038 B2 * 11/2011 Shimizu ................ F16C 19/386
29/898.09
2001/0006138 A1    7/2001 Nagaya

FOREIGN PATENT DOCUMENTS

DE     102014208484 A1 * 11/2015 ............ F16C 33/416
FR     2817233         5/2002
(Continued)

*Primary Examiner* — Phillip A Johnson
(74) *Attorney, Agent, or Firm* — Hauptman Ham, LLP

(57) ABSTRACT

The invention relates to a bearing cage for a bearing of the type comprising a first ring having a first bearing race, a second ring having a second bearing race, rolling bodies positioned in an annular rolling volume between the first and the second bearing races in such a way as to enable a relative rotation between the first and second rings around a reference axis of the bearing, the cage comprising cells for housing rolling bodies, the cage being characterised in that it comprises an interface for coupling with a maneuvering member, such that when the maneuvering member is engaged with the coupling interface, the bearing cage is capable of being rotationally driven by the maneuvering member in a predetermined direction with respect to the reference axis.

24 Claims, 17 Drawing Sheets

(51) Int. Cl.
 *F16C 33/38* (2006.01)
 *F16C 19/06* (2006.01)
 *F16C 19/54* (2006.01)

(52) U.S. Cl.
 CPC .......... *F16C 33/414* (2013.01); *F16C 43/065* (2013.01); *F16C 2361/61* (2013.01)

(58) Field of Classification Search
 CPC .............. F16C 2326/43; F16C 2360/31; F16C 2360/61; B64C 11/04; Y10T 29/4968; Y10T 29/49696; Y10T 29/497
 USPC ....................................................... 384/507
 See application file for complete search history.

(56) References Cited

FOREIGN PATENT DOCUMENTS

| | | | |
|---|---|---|---|
| FR | 2848625 | 6/2004 | |
| WO | WO-2007136367 A1 * | 11/2007 | ........... F04D 29/059 |
| WO | WO 2017/125135 | 7/2017 | |
| WO | WO 2018/092707 | 5/2018 | |

* cited by examiner

BEARING CAGE, ASSOCIATED ASSEMBLY AND ASSOCIATED MOUNTING AND DISMANTLING METHODS

TECHNICAL FIELD OF THE INVENTION

The invention relates, generally speaking, to the technical field of rolling contact bearings.

The invention more specifically relates to an assembly provided with a bearing to rotationally guide a first ring integral notably with a sub-assembly such as a blade of a propeller with variable pitch angle, with respect to a second ring integral with its support formed by another sub-assembly of the type rotating boss of a propeller.

PRIOR ART

Numerous propeller blades have variable pitch to optimise their operation. The blade is then extended by a pivot rotating in a housing of the boss of the propeller or, more generally, a support part.

A mounting device is known from the document EP 0 324 617 wherein this type of blade is fastened to a boss by one of its ends called blade root. The root of the blade can pivot, substantially along a reference axis, in a chamber of the boss, by means of bearings. The reference axis of the root is substantially merged with that of the blade. The bearings are arranged between the root and a side wall of the chamber. This wall, staged, is of revolution substantially around a radial axis of the boss. After mounting of the blade, the reference axis merges substantially with this radial axis. The chamber opens out on the side of the centre of the propeller by an interior side and on the side of the blade by an exterior side.

In the document EP 0 324 617, the bearings comprise at least a first exterior roller bearing and a second interior oblique contact ball bearing, the exterior roller bearing being located in the vicinity of the exterior side and the interior ball bearing being situated in the vicinity of the interior side.

When the propeller turns, the blade undergoes two actions: a centrifugal or axial force, function of its speed of rotation and its mass, and a bending moment in the blade root due to a radial force on the blade resulting from the interaction of the blade and the air that it stirs as well as vibrations of the system. The mounting device taught by EP 0 324 617 makes it possible to compensate these actions: the axial force is taken up by the interior ball bearing and the bending moment is taken up by the assembly of the two bearings.

It is also known from the document EP 0 843 635 to pre-load bearings in a propeller blade root assembly in order to enable the bearing assemblies to remain loaded in all aerodynamic conditions. The blade bearings make it possible to change the pitch of the blade in flight, that is to say by varying its orientation or angle of incidence. However, they also serve to lock the blade in the propeller boss. The blade root may have a widened end such that it cannot be extracted from the boss of the propeller as long as the bearings are in place.

In such an architecture, such a bearing cannot be installed assembled. The root of the blade is firstly positioned in a motor casing of the boss of the propeller then the balls are inserted one by one. The result is that the balls retain the blade in operation. Furthermore, such a bearing only enables the orientation of the blades in operation according to its pitch angle such that the angular extent of the displacement of the blade around its reference radial axis with respect to the axis of the boss is generally low, its speed of rotation also being relatively low. Another constraint of such a ball bearing is that said balls have to be able to be removed to mount and dismantle the blade in order to be able to ensure maintenance.

Due to such an architecture, this type of ball bearing does not have a cage. However, premature wear of the rolling bodies has been observed, these considerable degradations arising from shocks between balls due to the absence of device separating them.

DESCRIPTION OF THE INVENTION

The invention aims to overcome all or part of the drawbacks of the prior art by proposing notably a bearing making it possible to avoid degradation of the balls due to high contact pressures and to possible shocks therebetween, while the volume for housing the rolling bodies is only slightly accessible, for their mounting or their dismantling.

The invention also aims not to make more constraining, or even to improve, operations of maintenance of such a bearing by shortening them or by reducing the cost thereof.

For this purpose, according to a first aspect of the invention, a bearing cage is proposed for a bearing of the type comprising a first ring having a first bearing race, a second ring having a second bearing race, rolling bodies positioned in an annular rolling volume between the first and the second bearing races in such a way as to enable a relative rotation between the first and second rings around a reference axis of the bearing, the cage comprising cells for housing rolling bodies, the cage being remarkable in that it comprises an interface for coupling with a maneuvering member, such that when the maneuvering member is engaged with the coupling interface, the bearing cage is capable of being rotationally driven by the maneuvering member in a predetermined direction with respect to the reference axis.

Thanks to such a bearing cage, which notably ensures a function of spacing and of guiding the rolling bodies during the rolling phase, it is possible to handle said bearing cage easily by means of the maneuvering member, and this is so even if the bearing cage has to be handled in an environment leaving little space for standard tooling or for an operator during maintenance operations to enable its assembly or its handling.

According to a particular technical configuration, the interface for coupling with the maneuvering member is configured to ensure detachable coupling. Such a characteristic enables easy coupling and uncoupling of the bearing cage with the maneuvering member according to needs. According to an embodiment, the interface for coupling with the maneuvering member is configured to ensure coupling by elastic attachment, also called snap fitting, so as to enable cooperation by elastic deformation.

According to an embodiment, each cell for housing a rolling body is configured to shroud a rolling body so as to maintain it axially in said cell, and ensure the maintaining of the cage in the required rolling position during operating phases. In this way, the bearing cage ensures the separation of the rolling bodies and their circumferential driving in maintenance position or phase, the rolling bodies being furthermore maintained radially and axially by the interior and exterior rings of the bearing in rolling position. Preferably, the cells are configured to shroud the rolling bodies also to avoid centrifugation of the bearing cage while in operation.

According to an embodiment, the cells for housing rolling bodies are dimensioned such that the rolling bodies can escape from said cells under the effect of their own weight, the cells not retaining the rolling bodies radially at least along a radial direction and going in the sense of the reference axis towards the exterior of the cage. In this way, when a rolling body is not maintained radially by the interior and exterior rings, the force exerted by its own weight is sufficient for it to disengage from its housing cell. This is particularly interesting for maintenance operations, for example, during which the rolling bodies are placed facing an access channel opening onto the space delimited between the rings forming an annular volume and placing the annular rolling volume in communication with the external environment, the access channel having an interior section enabling at least the passage of the rolling bodies. In this way, the simple fact of displacing a rolling body facing this access channel enables the removal of said rolling body from the rolling space.

According to an embodiment, the bearing cage comprises an annular socket, notably configured to surround or encircle at least one axial portion of the first ring, and from which separations extend axially delimiting the cells for receiving rolling bodies, the bearing cage preferably further having openings formed on the frontal face opposite to said annular socket. This enables a disengagement of material guaranteeing non-interference with the surrounding parts and being able to represent an iso-functional gain in weight.

Advantageously, the socket has an axial end, axially opposite its frontal face, comprising a revolution profile, continuous or not, configured to ensure the centring of the maneuvering member. This revolution profile may be cylindrical or frustoconical so as to have a surface of revolution which converges towards the diameter of a part which receives the maneuvering member. In this way, the maneuvering member is guided by the socket of the bearing cage notably during its axial displacement until engaged with the coupling interface of said bearing cage.

In the case for example where the rolling bodies are balls, each cell advantageously has a contact surface configured to be locally complementary to that of the rolling body that it receives, the contact surface being able to extend for example onto a spherical shell portion. In this way, the bearing cage has at the level of each cell a shape locally hugging the spherical shape of the balls to ensure their guiding. It should be noted here that the contact surface ensures a contact with the rolling body on account of its guiding function, such a contact being necessary to guide a rolling body. However, in order not to tightly hold the rolling body in the cell, a predetermined cell clearance is configured so as not to block the rolling body.

According to an embodiment, the coupling interface comprises grooves distributed on its periphery and configured to receive jaw clutching legs of the maneuvering member. These grooves advantageously extend onto a predetermined angular portion of the bearing cage and are distributed uniformly around the bearing cage.

Preferably in this case, the bearing cage, in particular the coupling interface, comprises guiding walls configured to guide the displacement of each jaw clutching leg of the maneuvering member towards their corresponding groove. This enables a continuous guiding intended to facilitate the coupling manoeuvre of the maneuvering member with the bearing cage. In an embodiment, these guiding walls are arranged radially with respect to the reference axis and extend onto the outer periphery of the bearing cage while each forming a helicoidal or spiral portion around the reference axis.

According to a particular technical characteristic, the uncoupling movement of the maneuvering member from the bearing cage comprises a rotation with respect to the reference axis in a direction opposite to the predetermined direction of rotation of the bearing cage when it is rotationally driven by the maneuvering member engaged together.

According to an embodiment, the coupling interface of the bearing cage comprises at least a first of two coupling interfaces, one constituted by elastic hooks and the other by at least one groove, the first of the two coupling interfaces being configured to be engaged, preferably to cooperate, by elastic attachment (or snap fitting) with a second of the two coupling interfaces borne by the maneuvering member. The coupling interface is preferably distributed on the periphery of the bearing cage. Thus, in a given configuration, the coupling interface of the bearing cage comprises elastic hooks configured to be engaged elastically in at least one groove of the maneuvering member. In another opposite configuration, the coupling interface of the bearing cage comprises at least one groove configured to receive elastic hooks of the maneuvering member. Alternatively, these configurations are combined such that both the bearing cage and the maneuvering member comprise elastic hooks, and at least one groove configured to cooperate together, two by two, in a complementary manner.

According to an embodiment, the groove is bordered on the side receiving the elastic hooks during coupling by a radial projection, the projection comprising a guiding wall for guiding the elastic hooks during their coupling trajectory, the guiding wall preferably being configured to guide the maneuvering member towards a centred position with respect to the cage. Preferably, the guiding wall is configured to ensure elastic widening of the elastic hooks on a part at least of this trajectory.

According to a particular technical characteristic, the uncoupling movement of the maneuvering member from the bearing cage comprises, or even consists in, a translation with respect to the reference axis in a sense of moving away the maneuvering member with respect to the bearing cage.

According to an embodiment, the frontal face of the cage comprises at least one chamfer, preferably situated radially inwards, the chamfer being bordered by the frontal face and an inner face of the cage. This makes it possible to guarantee greater axial shrouding of the rolling body by the bearing cage while conserving a safety distance with the bearing races and thus to occupy more efficiently the rolling space for guiding the rolling bodies.

According to a second aspect, the invention also relates to a bearing comprising a first ring having a first bearing race, a second ring having a second bearing race, rolling bodies positioned in an annular rolling volume between the first and the second races in such a way as to enable a relative rotation between the first and second rings around a reference axis of the bearing, the first ring being moveable with respect to the second ring, notably axially, between a rolling position of the rolling bodies on the first and second bearing races and a maintenance position wherein the load supported by these rolling bodies is eliminated, the bearing being remarkable in that it comprises a bearing cage comprising all or part of the aforesaid characteristics.

According to an embodiment, the first ring can be displaced axially with respect to the second ring in such a way that the distance between the first and the second bearing races can be modified.

According to an embodiment, the rolling bodies are balls.

According to a third aspect, the invention relates to an assembly of a first mechanical sub-assembly with a second mechanical sub-assembly, the assembly comprising a bearing comprising a first ring having a first bearing race, a second ring having a second bearing race, the first ring being integral with the first sub-assembly and the second ring being integral with the second sub-assembly, rolling bodies positioned in an annular rolling volume between the first and the second bearing races in such a way as to enable a relative rotation between the first and second rings around a reference axis of the bearing, and an access channel placing the external environment in communication with the annular rolling volume, the access channel having an interior section enabling at least the passage of the rolling bodies, the first ring being moveable with respect to the second ring between a rolling position of the rolling bodies on the first and second bearing races and a maintenance position wherein the load supported by these rolling bodies is eliminated, the bearing comprising a cage comprising cells for housing rolling bodies, the assembly being remarkable in that the cage comprises an interface for coupling with a maneuvering member, such that when the maneuvering member is engaged with the coupling interface, the bearing cage is capable of being rotationally driven by the maneuvering member in a predetermined direction with respect to the reference axis.

According to an embodiment, the first sub-assembly can be displaced axially with respect to the second sub-assembly in such a way that the distance between the first and the second bearing races can be modified. In particular, the first sub-assembly can be displaced with respect to the second sub-assembly between the rolling position and the maintenance position, the relative movement of the first and second sub-assemblies driving the movement of the first and second rings, respectively.

According to an embodiment, the maneuvering member is configured to contribute to the axial locking of the first sub-assembly with respect to the second sub-assembly, notably the first ring with respect to the second ring, in rolling position.

According to an embodiment, the bearing cage and the maneuvering member comprise a coupling mechanism detachable between a coupling position of the bearing cage with the maneuvering member wherein coupling means of the maneuvering member are engaged with the coupling interface of the cage in such a way that the rotational displacement of the maneuvering member in the predetermined direction with respect to the reference axis drives the displacement of the bearing cage, in the maintenance position, and an uncoupled position enabling the displacement of the maneuvering member to lock the first ring axially with respect to the second ring, in rolling position. The driving of the cage by the displacement of the maneuvering member has at least two functionalities, one notably being able to lead the rolling bodies successively facing the access channel from where they may be removed, this in a maintenance position where the rolling bodies have to be taken out of the rolling space, the other functionality being able to position each cell of the cage successively facing the access channel to insert the rolling bodies into the rolling space, still in the maintenance position, during a maintenance phase or the original mounting of the device. To summarise, the rotational displacement of the maneuvering member in the predetermined direction with respect to the reference axis successively positions the cells facing the access channel from where the rolling bodies may be inserted or removed.

According to an embodiment, the bearing cage turns around the axis of the first sub-assembly to displace the rolling bodies in the direction of the access channel, this displacement being in the predetermined direction with respect to the reference axis.

According to an embodiment, the detachable coupling mechanism of the bearing cage with the maneuvering member comprises jaw clutching legs forming coupling means configured to be engaged in complementary grooves forming coupling interface. These grooves advantageously extend onto a predetermined angular portion of the bearing cage and are distributed uniformly around the bearing cage. Their angular extent must be sufficient to ensure firm maintaining of the cage in maintenance position, without all the same prohibiting subsequent unlocking. The coupling means of the maneuvering member thus form a complementary interface of the coupling interface of the bearing cage, the complementary interfaces making it possible to form together a coupling mechanism making it possible to ensure the coupling of the elements.

According to an embodiment, the coupling interface comprises guiding walls for guiding the displacement of each jaw clutching leg towards their corresponding groove. This enables a continuous guiding intended to facilitate the coupling manoeuvre of the maneuvering member with the bearing cage. In an embodiment, these guiding walls are arranged radially with respect to the reference axis and extend onto the outer periphery of the bearing cage while each forming a helicoidal or spiral portion around the reference axis.

According to an embodiment, the detachable coupling mechanism of the bearing cage with the maneuvering member comprises elastic hooks forming a coupling interface and configured to be engaged under elastic stress in at least one groove forming a complementary coupling interface. It will be noted that the cage has a shape extending along an annular shell, the elastic hooks being configured to be engaged inside the annular space and/or outside said annular shell; in other words, the elastic hooks may be interior and/or exterior. The complementary interfaces form together a coupling mechanism making it possible to ensure the coupling of the elements.

According to an embodiment, the groove extends substantially along an annular shell with respect to the reference axis, preferably circumferential with respect to the part that carries it, and has an opening oriented radially, for example inwards or outwards.

According to an embodiment, the elastic hooks comprise a body extending substantially axially, that is to say parallel to the reference axis, from a base integral with the part that carries it up to an end provided with a fastening head extending at least in part radially, and configured to be housed in the groove, resting against said groove thanks to the elastic stress exerted by the elastic hook on, or in, the groove. Advantageously, an axial coupling of the maneuvering member with the bearing cage, that is to say a translational coupling, is ensured by the elastic attachment of the elastic hooks in the associated groove(s).

According to an embodiment, an angular coupling of the maneuvering member with the bearing cage, that is to say a rotational coupling, is ensured by the cooperation of at least one elastic hook in at least one associated radial recess. Preferably, the recess extends along an angular sector greater than an angular sector of an elastic hook, for example along a virtually identical angular sector, that is to say very slightly greater, or just increased by a functional clearance. The recess may be a through recess, or not. Obviously, rotational coupling may be achieved by means of a plurality of radial recesses, each of these recesses being configured to guarantee the insertion of one or more hooks inside at least one of these recesses. In a particular configuration, the recesses may be positioned one with respect to the other to guarantee the insertion of at least one hook following a minimum angular rotation value. According to an embodiment, the recesses may have different dimensions such that the recesses receive only one hook or then several elastic hooks may cohabit in a same embodiment. The rotational coupling is carried out as soon as at least one of the hooks penetrates into one of the recesses.

Such a configuration, wherein the detachable coupling mechanism of the bearing cage with the maneuvering member comprises elastic hooks forming coupling interface configured to be engaged under elastic stress in at least one groove forming a complementary coupling interface, has the advantage of proposing a coupling mechanism being able, on the one hand, to be attached elastically or snap fitted axially whatever the angular position of the maneuvering member with respect to the cage and, on the other hand, to drive the cage by means of the maneuvering member by a rotation in a predetermined direction with respect to the reference axis, from the moment that, during rotation, an elastic hook penetrates by elastic return into its position of least stress or no stress in the radial recess and positions itself resting and in abutment against a side edge of said recess. Such a configuration also makes it possible to be free of a predetermined sense of rotation given that the user could rotationally drive the cage by means of the maneuvering member by a rotation in one sense or in the other.

According to an embodiment, the maneuvering member extends along the first sub-assembly so as to be accessible from the exterior, for the purpose of its handling. This is all the more advantageous in a configuration where the second sub-assembly is situated around the first sub-assembly, the first and second rings being coaxial, and the bearing cage being situated radially at least partially between the first and second rings and the maneuvering member being situated between the first and second sub-assemblies.

According to an embodiment, the maneuvering member has a fastening device, notably a threaded portion, configured to receive a locking means, notably a locking flange, through a tapped bore, the locking means being maintained in abutment against the second sub-assembly in rolling position to lock its axial position with respect to the second sub-assembly.

According to an embodiment, it comprises a second bearing, situated between the first and second sub-assemblies, the second bearing being axially spaced apart from the first bearing. This makes it possible to ensure better take up of the forces exerted between the first sub-assembly and the second sub-assembly. Ideally, these bearings are axially spaced apart the furthest possible from each other and at the very least sufficiently to enable the introduction of the rolling bodies.

According to an embodiment, the bearing races of the second bearing are frustoconical with respect to the reference axis, the rolling bodies of the second bearing comprising rollers, such as tapered rollers.

According to an embodiment, the first mechanical sub-assembly is a rotating shaft of which a first end is supported in rolling position, notably during rolling and/or operational phases of the propeller, by the second mechanical sub-assembly.

According to an embodiment, the first sub-assembly is a blade root of a propeller with variable pitch angle.

According to an embodiment, the second sub-assembly is a rotating boss of a propeller.

According to another aspect, the invention also relates to a method for mounting an assembly comprising all or part of the above characteristics, the mounting method being remarkable in that it comprises the following steps:
  putting in place the bearing cage in coupling position with the maneuvering member around the first sub-assembly;
  putting in place the assembly formed by the first sub-assembly, the bearing cage and the maneuvering member with respect to the second sub-assembly, the bearing being placed in maintenance position;
  opening the access channel in such a way that the rolling bodies can pass through it either to position themselves or to be positioned in cells delimited at least in part by the bearing cage in combination with the rotation of the cage in the predetermined sense, that is to say by the rotational displacement of the cage in a predetermined sense around its reference axis;
  disengagement of the bearing cage and the maneuvering member, displacement of the maneuvering member, and relative displacement of the first sub-assembly with respect to the second sub-assembly, up to the rolling position of the assembly;
  axial locking of the first mechanical sub-assembly with respect to the second mechanical sub-assembly, in the rolling position.

According to another aspect, the invention also relates to a method for dismantling or maintaining a bearing comprising all or part of the above characteristics, the dismantling or maintaining method being remarkable in that it comprises the following steps:
  axial unlocking of the first mechanical sub-assembly with respect to the second mechanical sub-assembly;
  displacement of the maneuvering member towards the bearing cage to be engaged on its coupling interface, in coupling position such that the bearing is brought into maintenance position;
  rotational displacement of the bearing cage in a predetermined sense around its reference axis to lead the rolling bodies towards the access channel enabling either their removal by an appropriate action, or their coming out under the effect of gravity.

BRIEF DESCRIPTION OF THE FIGURES

Other characteristics and advantages of the invention will become clear on reading the description that follows, with reference to the appended figures, which illustrate.

For greater clarity, identical or similar elements are marked by identical reference signs in all of the figures.

DETAILED DESCRIPTION OF AN EMBODIMENT

Figure 1:
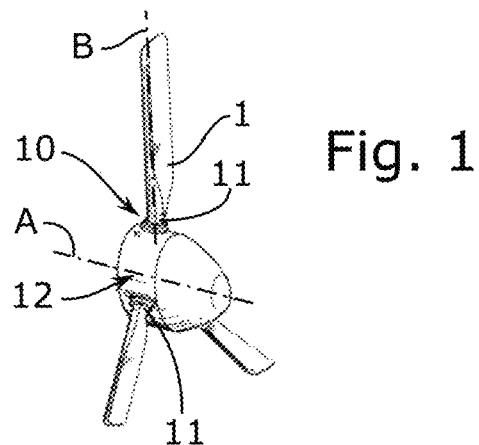
FIG. 1: a general view of a turning boss of a propeller equipped with propeller blades with variable pitch angle.

FIG. 1 illustrates a mounting of three blades 1 of the type with variable incidence angle in a boss 12 turning around an axis A of an aircraft propeller. This type of blade 1 is fastened to the boss 12 by one of its ends called root 11 of the blade 1. The root 11 of the blade 1 can pivot, substantially along an axis B, in a chamber 5 of the boss 12, by means of bearings. The axis B of the root 11 is substantially merged with that of the blade 1.

The bearings are arranged between the root 11 and a side wall of the chamber 5. This wall, staged, is of revolution substantially around a radial axis of the boss 12 forming reference axis of the assembly 10. After mounting of the blade 1, the axis B merges substantially with this radial axis. The chamber 5 opens out on the side of the centre of the propeller by an interior side 12B and on the side of the blade 1 by an exterior side 12A.

FIGS. 2, 3, 4, 5A, 5B, 5C, 6A, 6B, 7A, 7B, 7C, 8A, 8B, illustrate an embodiment of an assembly 10 provided with a bearing 20 to rotationally guide a first interior ring 21 integral notably with a first mechanical sub-assembly 11 such as a root of a blade of a propeller with variable pitch angle, with respect to a second exterior ring 22 integral with its support formed by a second mechanical sub-assembly 12 forming a turning boss of a propeller.

The root 11 of the propeller blade is housed in the chamber of the boss 12 so as to be in pivot linkage therewith. The root of the blade forming the first mechanical sub-assembly 11 is rotationally guided with respect to the boss forming the second sub-assembly 12 so as to vary its pitch angle by two bearings 20, 60, respectively a first bearing 20 and a second bearing 60 situated between the first and second sub-assemblies 11, 12, and being axially spaced apart from each other.

The first bearing 20, the furthest away from the blade and the closest to the axis of revolution A is an oblique contact ball bearing 23 oriented in such a way that its pressure centre is closer to the axis of revolution of the propeller than the bearing itself. This bearing 20 is situated in the vicinity of the end of the blade root 11 or in the vicinity of the interior side 12B in rolling position whereas the second bearing 60 is a roller bearing situated in the vicinity of the exterior side 12A, in rolling position of the blade with respect to the boss 12.

The bearing 20 comprises the first ring 21 having a first bearing race 211 and the second ring 22 having a second bearing race 221.

The first ring 21 has a first bearing race 211 and is integral with the first sub-assembly 11. The second ring 22 has a second bearing race 221 and is integral with the second sub-assembly 12. These rings may be formed of one piece with another adjacent part in the assembly 10 or instead be fastened to another part to be integrated in the sub-assembly by securing. In this example, the exterior second ring 22 is shrink fitted in the propeller boss 12 and the first interior ring 21 is integral with the blade root, for example in a detachable manner for maintenance reasons, and resting against a shoulder of the blade root turned opposite to the axis of revolution of the propeller boss.

Figure 2:
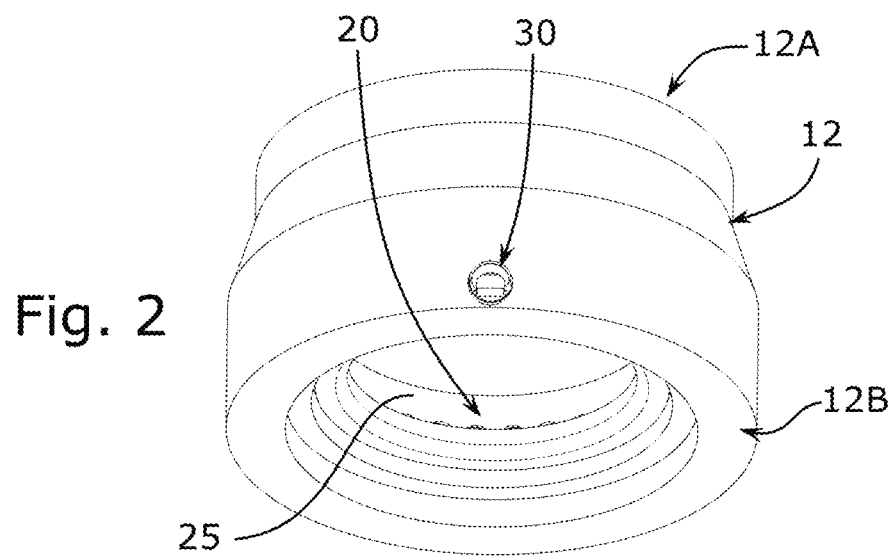
FIG. 2: a general perspective view of a part of a boss intended to receive a blade root of a propeller with variable pitch angle according to an embodiment.
Figure 3:
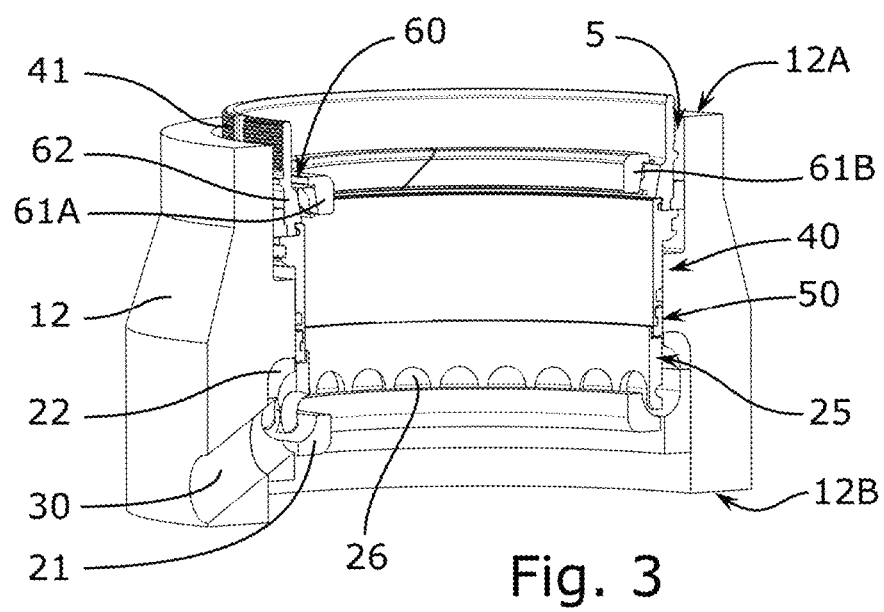
FIG. 3: a cutaway view of an assembly for a bearing according to this embodiment.
Figure 4:
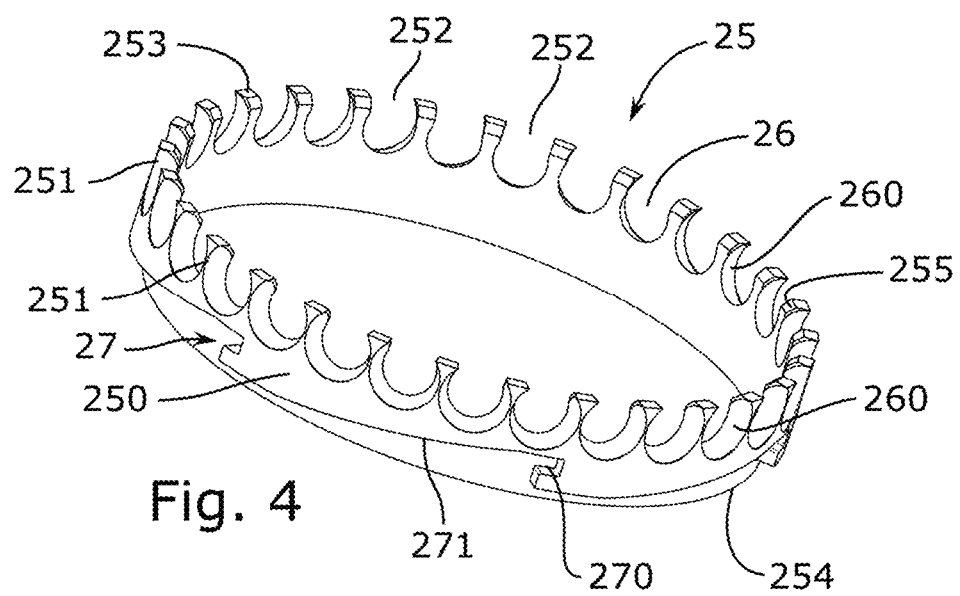
FIG. 4: a perspective view of a cage according to this embodiment.

In FIGS. 2 and 3, the whole of the first sub-assembly 11 is not illustrated to improve their legibility, only the first interior rings 21, 61 of the bearings 20, 60 being illustrated.

The bearing 20 comprises rolling bodies 23, here balls, configured to be positioned in an annular rolling volume 24 between the first and the second bearing races 211, 221 in such a way as to enable a relative rotation between the first ring 21 and the second ring 22 around a reference axis X of the bearing 20, corresponding in assembled position to the axis B of rotation of the roots 11 of the blade 1. To maintain the rolling bodies 23 equidistant and guide them in the rotational movement, the bearing 20 is provided with a cage 25 comprising cells 26 for housing the rolling bodies 23. The bearing cage 25, illustrated in detail in FIG. 4, comprises an annular socket 250 configured to surround at least partially the first ring 21, the bearing cage 25 being intended to surround or encircle at least partially the first ring 21 to be placed radially facing the first bearing race 211, and notably the cells 26 of the cage are intended to surround the first ring 21. In this configuration, the cage 25 is situated radially with respect to the reference axis X between the first ring 21 and the second ring 22, i.e. radially between the first sub-assembly 11 having the form of a rotating shaft end constituted by the blade root and its boss 12 forming support.

Separations 251 extend axially from said socket 250 while delimiting the cells 26 for housing rolling bodies 23. These separations 251 make it possible to conserve the rolling bodies equidistant in the volume or the annular rolling space 24. In this way, any contact or shock between two neighbouring rolling bodies 23 is totally eliminated.

To guarantee minimum bulk of the bearing cage 25 in the annular rolling space 24, openings 252 are formed on a frontal face 253 opposite to said annular socket 250. Each cell 26 has a contact surface 260 configured to guide the rolling body 23 that it receives and to be in direct contact therewith if need be, the contact surface 260 extending onto a portion of spherical shell so as to have locally a shape complementary to the ball 23 that said cell 26 receives. The contact surface 260 of each of the cells 26 extends continually between two adjacent separations 251 of a same cell 26 while passing through the socket portion 250 that connects them. This contact surface 260, here in the form of spherical shell portion, is configured to extend radially inside the bearing 20 from the nominal diameter of the ball 23 up to a diameter less than said nominal diameter. In this way, the contact surface 260 ensures a shrouding which is not liable to retain a ball radially outwards. Such a configuration makes it possible to improve the function of guiding the rolling bodies 23 by the cage 25 and not to impede the travel of the rolling bodies 23 during the maintenance procedure aiming to take it out of the bearing 20 via a dedicated access channel 30.

Each cell 26 for housing a rolling body 23 is configured to shroud a rolling body 23 so as to maintain it axially in said cell 26. The balls thus cannot escape from the cells 26 axially via the openings 252.

In assembled position, the bearing 20 is positioned between the first and second sub-assemblies 11, 12 carrying the first and second rings 21, 22 respectively, the result is a confinement of said bearing 20 given that these first and second sub-assemblies 11, 12 have a relatively important bulk. To ensure access to the rolling bodies 23, the assembly 10 comprises an access channel 30 placing the external medium in communication with the annular rolling volume 24. The access channel 30 passes through the boss 12 and has an interior section enabling the passage of the rolling bodies 23. When the propeller is in operation, this access channel 30 is generally closed by a sealing cap (see FIG. 7C).

The access channel 30 is configured to pass through the second sub-assembly 12. Said access channel 30 opens out at an interior end in the annular rolling volume 24 and at an exterior end, on an exterior surface of the assembly 10, accessible for an operator carrying out a maintenance or assembly operation. This access channel 30 is configured so as to have a slope a with respect to the axis X, for example between 50 and 70 degrees (see FIG. 7B), its exterior end being axially offset towards the interior side 12B of the assembly with respect to its inner end. In this way, a rolling body 23 can roll in this access channel 30 while being driven by simple effect of gravity towards the exterior of the volume 24 when the blade is vertical, oriented upwards. Put another way, in vertical maintenance position, when the blade root 11 is above the axis of revolution of the boss 12 of the propeller and when the reference axis of the blade root is in a vertical plane, the access channel 30 is rising from the exterior towards the chamber 5 of the propeller boss 12. An annular shim 28 is present in the propeller boss 12, for example while being shrink fitted to said boss 12 or integrated in this boss 12, and forms the interior mouth of the access channel 30.

The cells 26 of the cage 25 are furthermore dimensioned such that the rolling bodies 23 may escape from said cells 26 under their own weight when the cells 26 are vertical or quite close to vertical, the cells 26 not themselves retaining the rolling bodies 23 radially. In this way, when a ball 23 of the bearing 20 is positioned simply facing the interior end of the access channel 30, on the one hand the cage 25 will not form an obstacle to the rolling body 23 so that it escapes to the access channel 30 and, on the other hand, the access channel 30 could guide the ball 23 directly outwards. To ensure the correct functioning of these operations, the assembly 10 is positioned in a certain direction during assembly and maintenance operations to benefit from the advantage of this slope and from the orientation of the parts given the gravitational effect on the ball. In practice, the assembly is ideally positioned vertically, that is to say that its reference axis X is oriented parallel to a vertical axis, the blade of the propeller being directed upwards. It will be noted that, in this configuration, the assembly could also be oriented such that its reference axis X is oriented parallel to a horizontal axis.

The assembly 10 is configured such that the first ring 21 is moveable with respect to the second ring 22 between a rolling position of the rolling bodies 23 on the first and second bearing races 211, 221, and a maintenance or assembly position wherein the load supported by these rolling bodies 23 is eliminated.

More generally, the first and second rings 21, 22 of the ball bearing 20 each being borne respectively by the first and the second sub-assemblies 11, 12, said first sub-assembly 11 formed by the blade root can be displaced axially with respect to the second sub-assembly 12, the boss, in such a way that the distance between the first and the second bearing races 211, 221 can be modified axially. The rolling position corresponds to a position of use of the bearing 20 wherein the rolling bodies 23 are stressed, notably at the level of the required preloading, between their bearing races 211, 221 and the maintenance or assembly position corresponds to a position wherein the load on the rolling bodies 23 is eliminated, thus enabling the handling thereof.

The assembly 10 further comprises a maneuvering member 40 having a double functionality: a first of its functionalities is to make it possible, during an assembly step, to maintain at least one part of the bearing 20 integral, and notably the bearing cage 25, during the insertion of the blade roots; a second of its functionalities is to contribute to the axial locking of the first ring 21 with respect to the second ring 22, and notably the first sub-assembly 11 (the blade root) with respect to the second sub-assembly 12 (the boss), in rolling position, this axial mobility being useful during maintenance and assembly operations.

For this purpose, the cage 25 comprises an interface for coupling 27 with the maneuvering member 40 such that when the maneuvering member 40 is engaged with the coupling interface 27, the bearing cage 25 is capable of being rotationally driven by the maneuvering member 40 in a predetermined direction D1 with respect to the reference axis X. This direction D1 determines in practice the sense of rotation of the cage 25 to bring successively each of the balls 23 facing the access channel 30 to remove the rolling bodies 23 during a maintenance operation aiming to replace them, or conversely, to place each of the cells 26 facing the access channel 30 for the purpose of receiving a ball 23 inserted via the access channel 30.

The coupling interface 27 of the bearing cage 25 forms with the coupling means 47 of the maneuvering member 40 a detachable coupling mechanism 50. This coupling mechanism 50 is detachable between a coupling position of the bearing cage 25 with the maneuvering member 40 and an uncoupled position. The coupling position of the bearing cage 25 with the maneuvering member 40 corresponds to a position wherein the coupling means 47 of the maneuvering member 40 are engaged with the coupling interface 27 in such a way that the rotational displacement of the maneuvering member 40 in the predetermined direction D1 with respect to the reference axis X rotationally drives the displacement of the bearing cage 25. This driving may have the functionality of leading the rolling bodies 23 to the access channel 30 from where they may be removed in the maintenance position when it involves removing them or may be implemented to be able to position each cell 26 of the cage 25 successively facing the access channel 30 to insert the rolling bodies 23 in the rolling space 24, in maintenance position during a maintenance phase or during the original mounting. The uncoupled position of the bearing cage 25 with the maneuvering member 40 enables for its part the axial displacement of the maneuvering member 40 in a direction opposite to the bearing cage 25 to lock axially indirectly the first ring 21 with respect to the second ring 22 in rolling position. This locking is ensured directly by the blocking of the first sub-assembly 11 forming blade root with the second sub-assembly 12 forming boss.

For this purpose, the maneuvering member 40 has a fastening device such as a threaded portion 41 configured to receive a locking flange 42 (see FIG. 7C), forming locking means, through a tapped bore, the locking flange 42 being maintained in abutment against the second sub-assembly 12 in rolling position to lock its axial position with respect to the second sub-assembly 12.

Furthermore, the maneuvering member 40 extends along the rotating shaft forming blade root 11 so as to be accessible from the exterior. The threaded portion 41 equips a distal end of the maneuvering member 40 oriented on the exterior side 12A so as to be always accessible from the exterior and to allow an operator to fasten the locking flange 42 by screwing on said threaded portion thus blocking the axial position of the blade root 11 in the boss 12 (see FIG. 7C).

To obtain a detachable coupling mechanism 50 responding to the need to be able to handle the bearing cage 25 via the maneuvering member 40 thanks to a part of this maneuvering member 40 left accessible from the exterior of the assembly 10, the coupling interface 27, and in particular its socket 250, is provided with grooves 270 distributed on its periphery and configured to receive jaw clutching legs 470 of the maneuvering member 40 forming coupling means 47. The grooves extend circumferentially onto the socket 250, here on its radially exterior side with respect to the reference axis X.

Guiding walls 271 are provided on said socket 250 to guide in a continuous manner the displacement of each jaw clutching leg 470 of the maneuvering member 40 towards their corresponding groove 270. These guiding walls 271 are arranged radially with respect to the reference axis X to enable a contact and an axial resting of the jaw clutching legs 470 on said guiding walls 271 during assembly. The guiding walls 271 extend onto the exterior periphery of the bearing cage 25 while each forming a helicoidal or spiral portion around the reference axis X leading, at one end of this spiral portion, up to the corresponding groove 270. In this particular configuration, the jaw clutching legs 470 and the associated grooves 270 extend globally in a manner parallel to a plane perpendicular to the reference axis X, this making it possible both to retain the coupled position efficiently while guaranteeing that the detachable coupling interface 27 facilitates the disengagement of the cage 25 and the maneuvering member 40. Generally speaking, the jaw clutching legs 470 and the grooves 270 must be axisymmetric and complementary two-by-two, or at least enable a relative rotation therebetween.

To facilitate the axial coupling of the maneuvering member 40 with the cage 25, the socket 250 is provided at an axial end 254, axially opposite its frontal face 253, with a revolution profile configured to ensure the centring of the maneuvering member 40. This revolution profile is here formed by a locally frustoconical portion of the exterior wall of the socket 250 extending axially onto a portion situated between the end 254 and the guiding walls 271, preferably at its axial end 254, such as a chamfer (not illustrated in the figures). The maneuvering member 40 has a revolution profile which, on axially coming closer to the cage 25, is auto-centred with respect thereto while being guided by this frustoconical wall which it shrouds while positioning itself coaxially to the reference axis X of the cage 25.

Figure 5A:
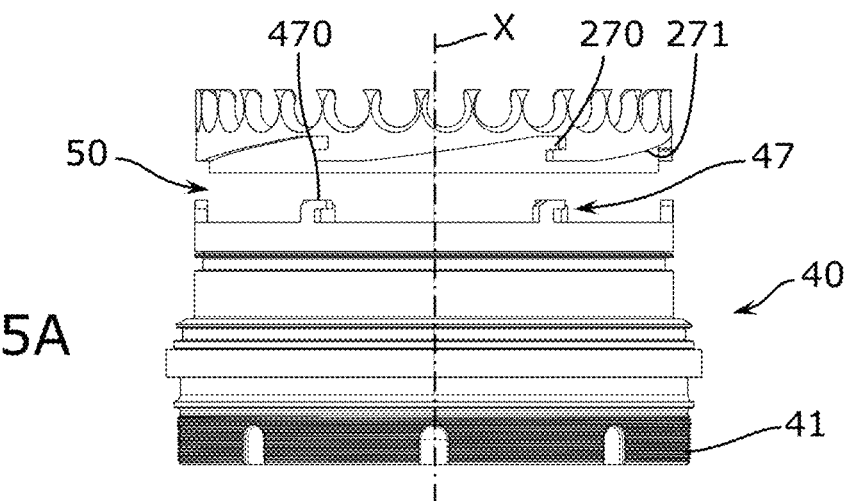
FIG. 5A: a front view of a bearing cage and a maneuvering member according to this embodiment in uncoupled position.
Figure 5B:
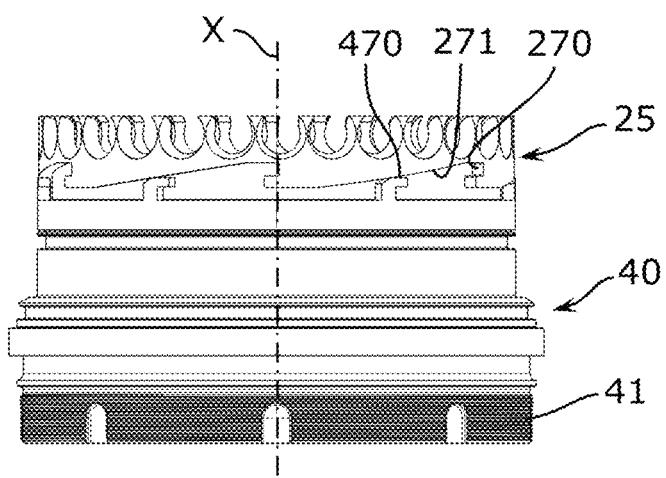
FIG. 5B: a front view of a bearing cage and a maneuvering member according to this embodiment in intermediate position between the uncoupled position and the coupled position.
Figure 5C:
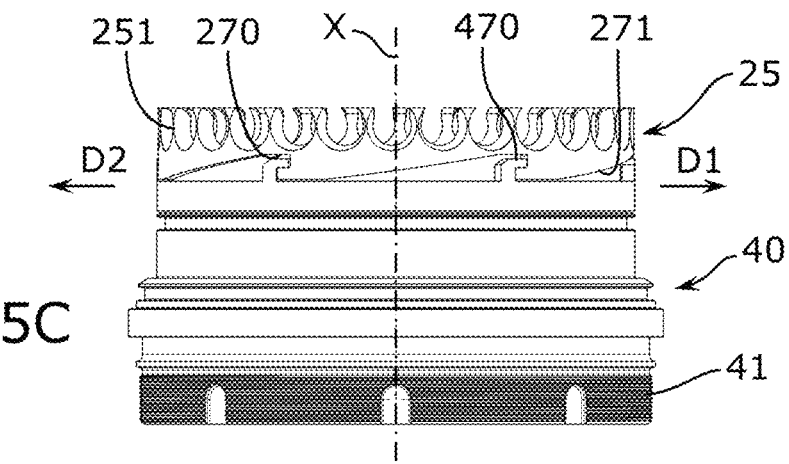
FIG. 5C: a front view of a bearing cage and a maneuvering member according to this embodiment in coupled position.
Figure 6A:
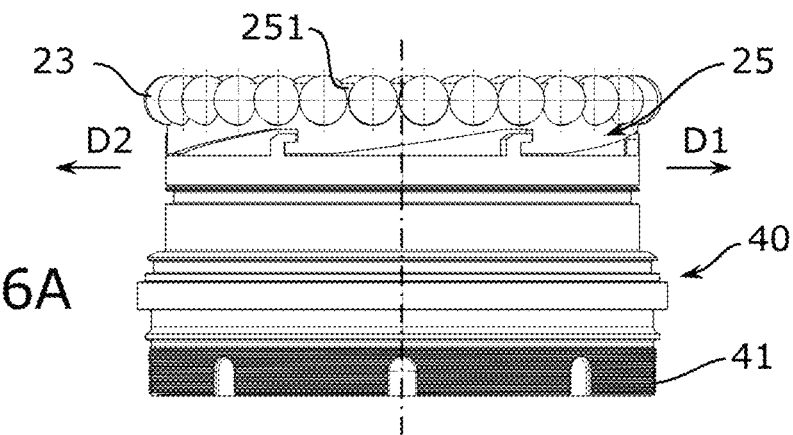
FIG. 6A: a front view of a bearing cage and a maneuvering member according to this embodiment in coupled position, the cage being equipped with rolling bodies.
Figure 6B:
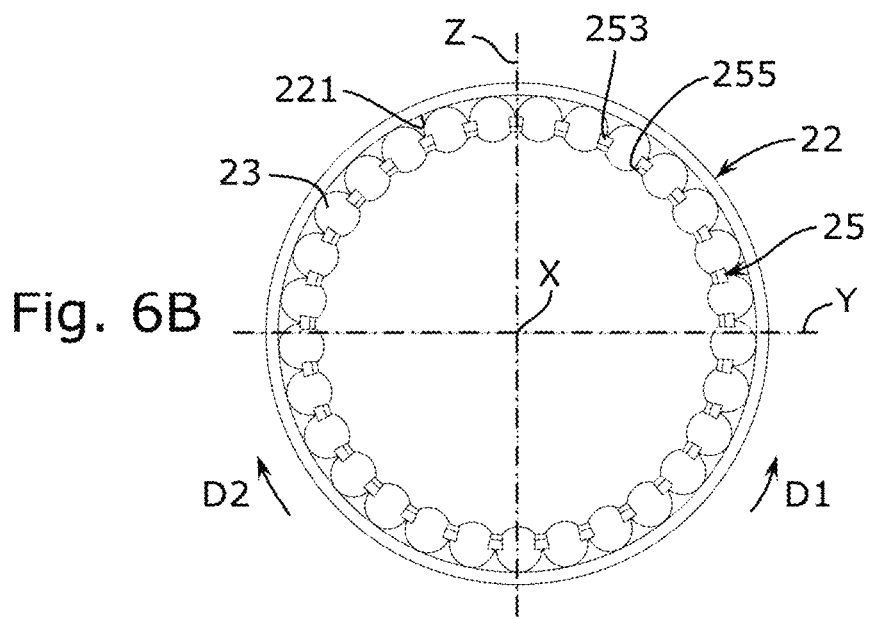
FIG. 6B: a top and partial view of FIG. 6A.

Such a detachable coupling mechanism 50 is very simple to use in that it enables an engagement of the maneuvering member 40 with the cage 25 by a simple axial movement in a direction of bringing together the two parts combined with a rotation of the maneuvering member 40 in a predetermined sense D1. FIGS. 5A, 5B and 5C illustrate positionings of the bearing cage 25 and the maneuvering member 40 successively in uncoupled position then in an intermediate position between the uncoupled position and the coupled position and finally in the coupled position. To uncouple or disengage the two parts, it suffices to carry out simply a rotation of the maneuvering member 40 with respect to the reference axis X in a direction D2 opposite to the predetermined direction D1 of rotation of the bearing cage 25.

In a complement to this first bearing 20, and with the aim of ensuring better distribution of forces, the second bearing 60 is situated between the first and second sub-assemblies 11, 12, the second bearing 60 being spaced axially from the first bearing 20.

The bearing 60 the closest to the blade and the furthest away from the axis of revolution of the propeller is a bearing with tapered rollers 63, oriented in such a way that its centre of pressure is further away from the axis of revolution of the propeller than the bearing itself. The first interior ring 61 of this bearing 60 with tapered rollers is axially resting against a shoulder formed on the blade root 11, the shoulder being turned towards the axis of revolution of the propeller boss 12.

The bearing 60 comprises this first interior ring 61 which has a first bearing race 611 and a second exterior ring 62 having a second bearing race 621.

The first ring 61 is integral with the first sub-assembly 11 and the second ring 62 is here a portion of the maneuvering member 40. This second bearing 60 is thus interposed between the first sub-assembly 11 and the maneuvering member 40. In the same way as the first bearing 20, these rings 61, 62 may be formed in one piece with another adjacent part in the assembly 10 or instead be fastened to the other part. In this embodiment, the first ring 61 is transferred onto the first sub-assembly 11 in the form of two complementary half-rings 61A, 61B (visible in FIG. 3) maintained fastened together whereas the second ring 62 is formed directly by a wall of the maneuvering member 40.

The bearing 60 comprises rolling bodies 63, here tapered rollers, configured to be positioned in an annular rolling volume 64 between the first and the second bearing races 611, 621 in such a way as to enable a relative rotation between the first and second rings 61, 62 around the axis of the bearing 60 merged with the reference axis X of the bearing 20. The bearings being inclined with respect to the reference axis, the bearing races 611, 621 of the second bearing 60 are frustoconical with respect to the reference axis X. A variable volume chamber 35 (see FIG. 7C) is delimited on the one hand, between a cylindrical skirt 34 of the chamber 5 formed in the propeller boss 12, and on the other hand, the maneuvering member 40, which may be supplied with hydraulic fluid to actuate the maneuvering member 40 in the manner of a piston between the maintenance and bearing positions. The maneuvering member 40 thus constitutes, with the variable volume chamber, a hydraulic jack incorporated in the mechanical assembly 10 in the chamber 5.

Other characteristics and advantages of the invention will become clear in light of the different methods for mounting, dismantling or maintaining which will be described hereafter.

To assemble the blade root 11 in its boss 12, the following steps are implemented.

The first rings 21, 61 of the first and second bearings 20, 60 are fastened on the blade root 11. They are each formed of two complementary semi-circular half-rings connected to each other. The rollers 63 are positioned on the first race 611 and maintained together by a cage 65. The second ring 22 of the bearing 20 is for its part also fastened to the interior of the chamber of the boss 12 by shrink fitting, a slight shrink fitting being sufficient, after having been introduced inside the boss 12. The bearing cage 25 and the maneuvering member 40 are next positioned in coupling position around the first sub-assembly 11, that is to say around the blade root intended to be housed in the boss 12 of the propeller. In this coupling position, the cage 25 is positioned coaxially to the first ring 21 of the bearing 20.

This pre-assembly is next inserted axially into the chamber of the boss which receives it up to a position such that the rings 21, 22 define an annular volume 24 being able to receive the rolling bodies 23, in particular in a maintenance position of the bearing 20. An annular mounting volume 24 is thus constituted between the bearing races 211, 221, and delimited on the interior side 12B by the annular shim 28. The cage 25 penetrates into this annular volume 24. This annular mounting volume corresponds to a larger volume than the annular rolling volume due to the difference in distance between the bearing races 211, 221 between the maintenance and rolling positions. However, since the same elements delimit these two spaces, the same reference 24 designates these two spaces in the figures.

The access channel 30 is next opened in such a way that the rolling bodies 23 can pass through it from the exterior to the interior to position themselves in cells 26 delimited at least in part by the bearing cage 25. The operator accompanies the ball until it is housed in the associated cell 26 then turns the cage 25 which moves away said ball 23 from its counterpart with the access channel 30 such that said ball 23 is maintained by the annular shim 28 together with the second bearing race 221 of the second ring 22, preventing its falling out under the effect of gravity. In other words, at each step of rotation of the cage 25, the ball 23 that has been inserted and all those which precede it rotate a fraction of a turn on the bearing race 211 of the first ring 21 internally and externally on the annular shim 28.

Figure 8A:
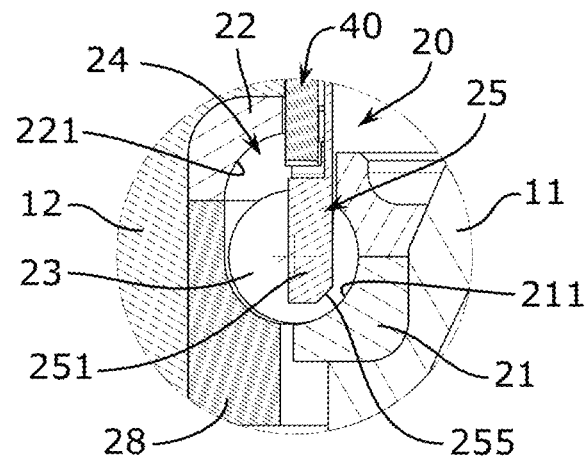
FIG. 8A: a detail of FIG. 7C.
Figure 8B:
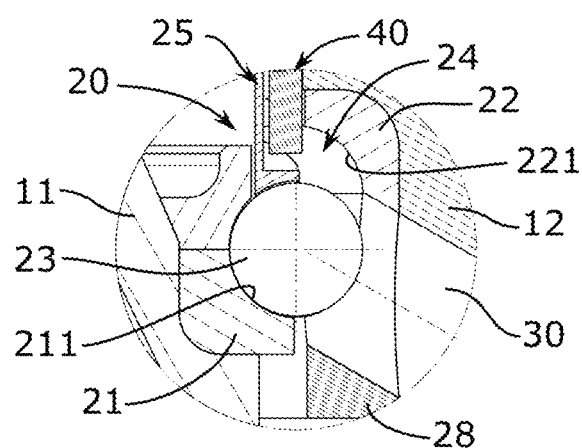
FIG. 8B: a detail of FIG. 7C.
Figure 9:
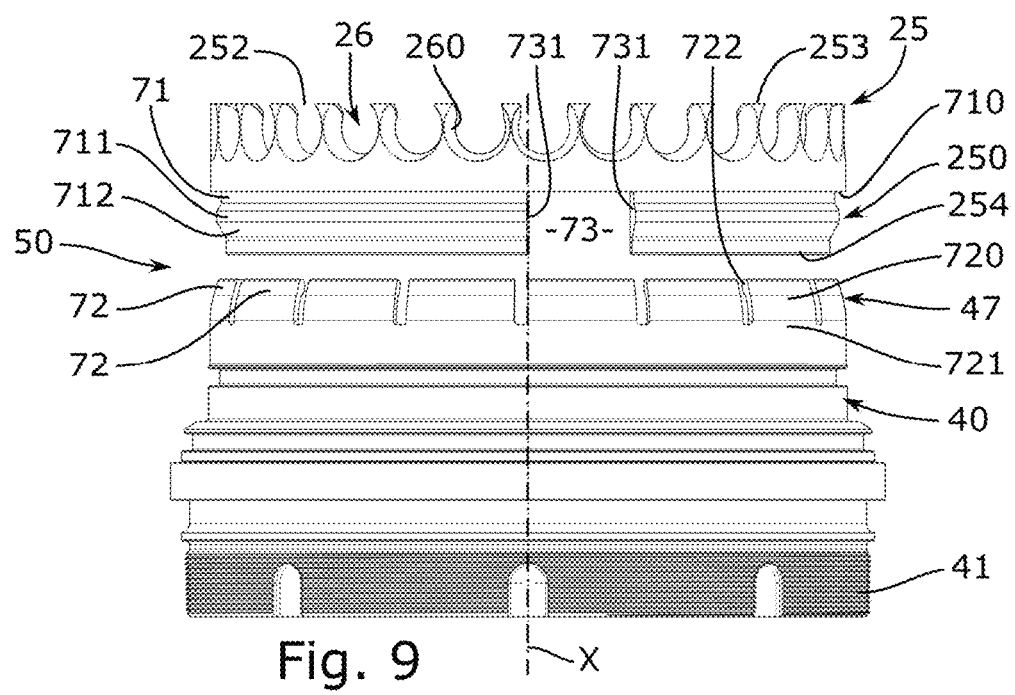
FIG. 9: a front view of a bearing cage and a maneuvering member according to another embodiment in uncoupled position.
Figure 10A:
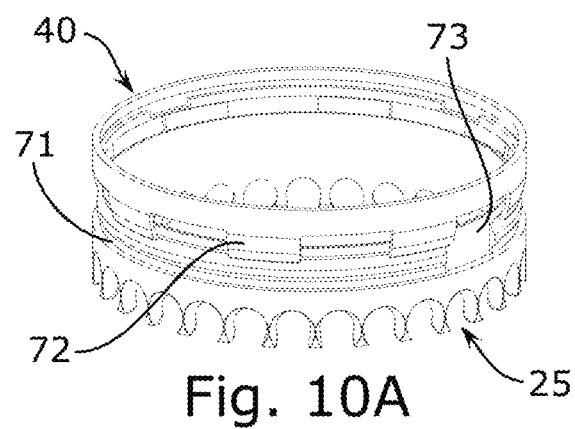
FIG. 10A: a perspective view of a cage and a portion of a maneuvering member according to the embodiment of FIG. 9, in uncoupled position.
Figure 10B:
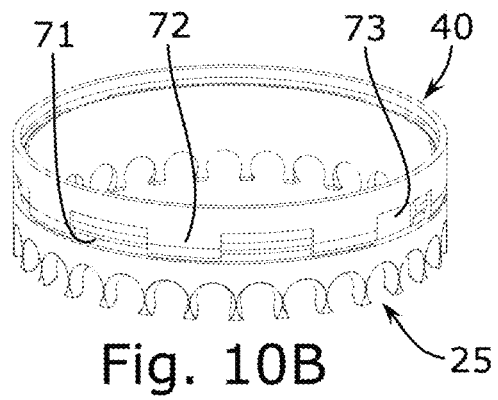
FIG. 10B: a perspective view of a cage and a portion of a maneuvering member according to the embodiment of FIG. 9, in translationally, but not rotationally, coupled position.
Figure 10C:
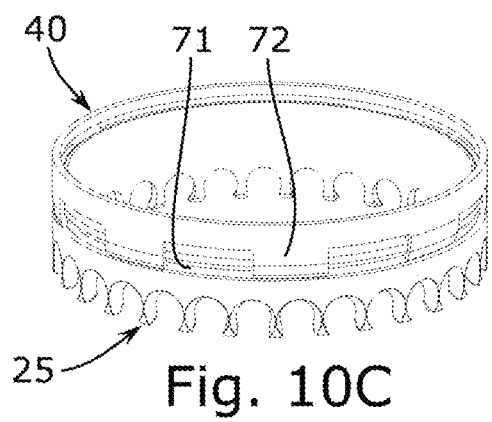
FIG. 10C: a perspective view of a cage and a portion of a maneuvering member according to the embodiment of FIG. 9, in translationally and rotationally coupled position.

FIGS. 8A and 8B illustrate details of the bearing 20 in section in which is visible the annular volume 24 inside of which the balls 23 are inserted. A consequence of the necessity of axially inserting the blade root 11 with the cage 25 and the maneuvering member 40 is that the shapes must not create an obstacle to this movement. To satisfy this constraint, the largest diameter of the interior ring 21 is configured so as to be less than the smallest diameter of the exterior ring 22. The first and second rings 21, 22, and notably their associated races 211, 221 may extend along an angular sector less than or equal to 90°. The annular shim 28 makes it possible to form with the first ring 21 a support cradle for the balls 23 in maintenance position of the bearing 20 during a maintenance phase or during the initial mounting/assembly thereof.

In this maintenance position, the cage 25 and the maneuvering member 40 are axially aligned and form a same engaged or secured assembly arranged coaxially and radially between the root 11 of the blade and the chamber of the boss 12. Furthermore, the rings 21, 22 are axially spaced apart from each other such that the smallest distance separating them is strictly greater than the diameter of the balls 23 such that a ball 23 housed in this volume 24 in maintenance position does not support any load. This space between the rings 21, 22 is also sufficient to be able to guarantee the passage of a rolling body 23 between the two rings 21, 22 for their insertion or their removal. Indeed, in this way, it is not necessary to provide an access channel opening out directly on the bearing race 221. The design and the dimensioning of such a cap being much more complex and costly given the fact that such a cap must be maintained perfectly flush with the raceway. In the embodiment such as illustrated, it is simply easy to be free of such a constraint.

Still in this maintenance position, where the bearing cage 25 is coupled with the maneuvering member 40, the jaw clutching legs 470 forming coupling means 47 of the maneuvering member 40 are engaged with the grooves 270 of the coupling interface 27 in such a way that the rotational displacement of the maneuvering member 40 in the predetermined direction D1 rotationally drives the bearing cage 25. Thus, the bearing cage 25 may be rotated by an operator who has access to the distal end of the maneuvering member 40 accessible from the outside via an axial projection with respect to the sub-assemblies 11, 12. In practice, this rotational driving is carried out by an action of an operator directly on the blade, for example with a suitable tool as a function of the dimension of the blade, the rotation of the blade driving the rotation of the ring of balls. This manual rotation makes it possible to place successively each of the cells 26 facing the access channel 30, for example to insert therein a ball 23.

When all the cells 26 house a ball 23, the bearing cage 25 is then disengaged from the maneuvering member 40 by a rotation of the maneuvering member 40 with respect to the reference axis X in a direction D2 opposite to the predetermined direction D1 of rotation of the bearing cage 25, completed by an axial translation in a direction of moving away with respect to the cage 25. In this movement, the distal end of the maneuvering member 40 extends out in a more important manner on the exterior of the assembly 10 which makes it possible to have access to the threaded portion 41 configured to receive a locking flange 42 (see FIG. 7C). When the flange 42 is screwed onto said threaded portion 41, the boss 12 is held tightly axially between said flange 42 and the blade root 11 blocking their relative axial positions.

In a substantially concomitant manner or subsequent to this axial movement of the maneuvering member 40 up to the position of axial locking of the two mechanical sub-assemblies 11, 12, the rings 21, 22 are brought closer together so as to place the bearing 20 in rolling position, the rolling bodies 23 thus being pre-loaded. The bearing 60 is also pre-loaded at the same time as the first bearing 20. During the translational movement of the maneuvering member 40 from the maintenance position to the rolling position, the uncoupling is carried out in a simultaneous manner when said translation is initiated, then the preloading could be carried out whereas the bearing cage 25 will be completely uncoupled, this to avoid tearing out the bearing cage 25 while moving back the maneuvering member 40.

This bringing together of the bearing races 211, 221 is carried out by injecting a hydraulic fluid into the variable volume chamber, which has the effect of axially pushing upwards the ring 62 with tapered rollers, which drives in its translational movement the blade root 11, and thus the interior ring(s) 21 of the ball 23 bearing 20. The annular volume 24 reduces progressively until taking the dimension of the annular housing of FIG. 7C, when the balls 23 enter into contact with the second exterior bearing race 221. If need be, the hydraulic pressure applied in the variable volume chamber enables the loading of opposing bearings and the tensioning of the blade root.

Once the rolling position reached and the bearings pre-loaded, the operator can carry out the axial locking of the first mechanical sub-assembly 11 with respect to the second mechanical sub-assembly 12 by means of a nut such as the locking flange 42.

The annular rolling space 24 being particularly narrow, even for a bearing cage 25, a minimum distance between said bearing cage 25 and the races 211, 221 must be provided for safety in order to avoid any risk of degradation of said races 211, 221 or of the cage itself. In order to guarantee all the same good shrouding of each rolling body while respecting these size constraints, the frontal face 253 of the cage 25 comprises at least one chamfer 255, preferably situated at its radially interior end: this chamfer 255 guarantees against the risk of collision of the bearing cage 25 with the race and makes it possible in parallel to position the frontal face 253 further away thus increasing shrouding and improving the guiding of the balls 23.

In operational rolling position, the rotation of the propeller boss 12 around its axis of revolution makes it possible to drive the propeller and the blade. A mechanism for adjusting the pitch angle of the blade, not illustrated in the figures, makes it possible to maintain or to modify, according to needs, the pitch angle of the blade, by turning the blade root in its bearings 20, 60 for guiding around the reference axis X, and by blocking the blade root 11 in the desired angular position.

In other circumstances, the assembly 10 could be dismantled or the balls will have to be replaced or inspected. To dismantle or ensure the maintenance of the blade root 11 in its boss 12, the following steps are implemented, going substantially in the reverse order.

Figure 7A:
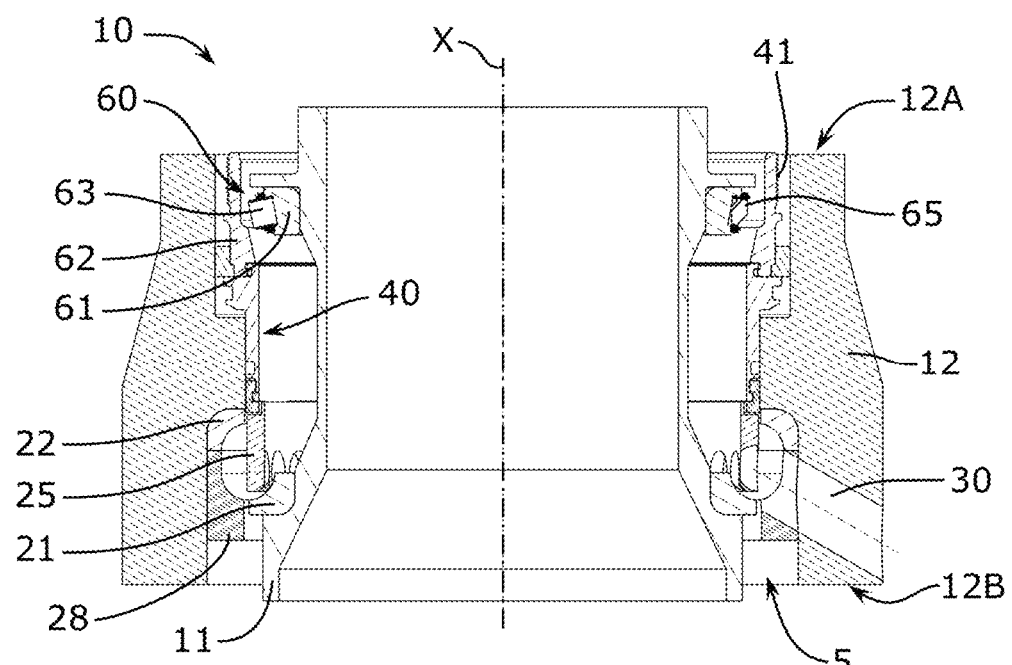
FIG. 7A: a sectional view of an assembly according to this embodiment in maintenance position of the bearing and in coupled position, illustrated without rolling bodies.
Figure 7B:
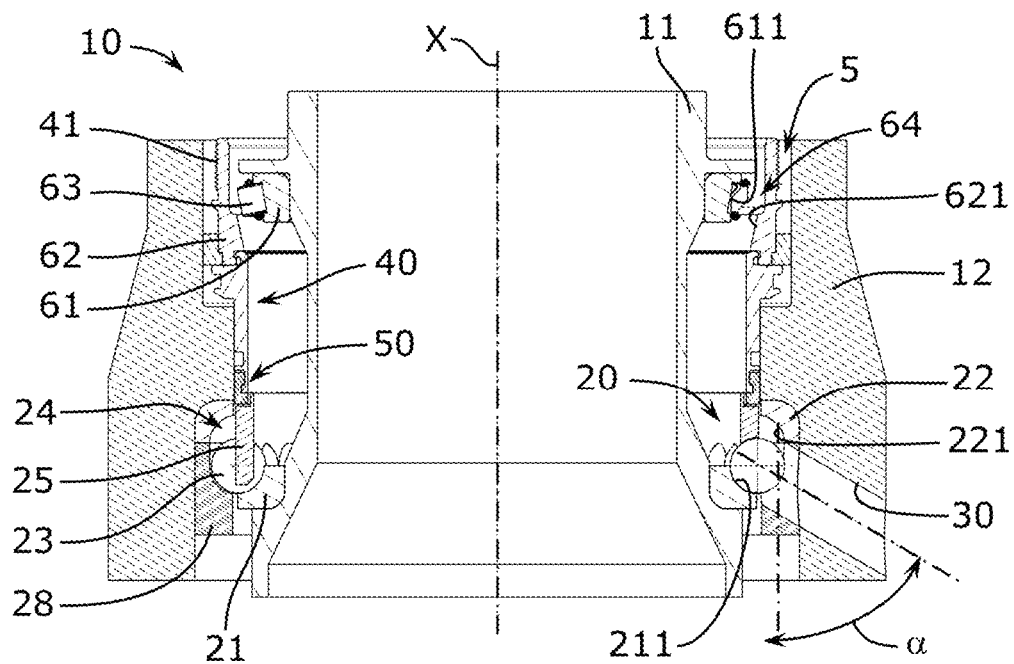
FIG. 7B: a sectional view of an assembly according to this embodiment in maintenance position of the bearing and in coupled position, provided with rolling bodies.
Figure 7C:
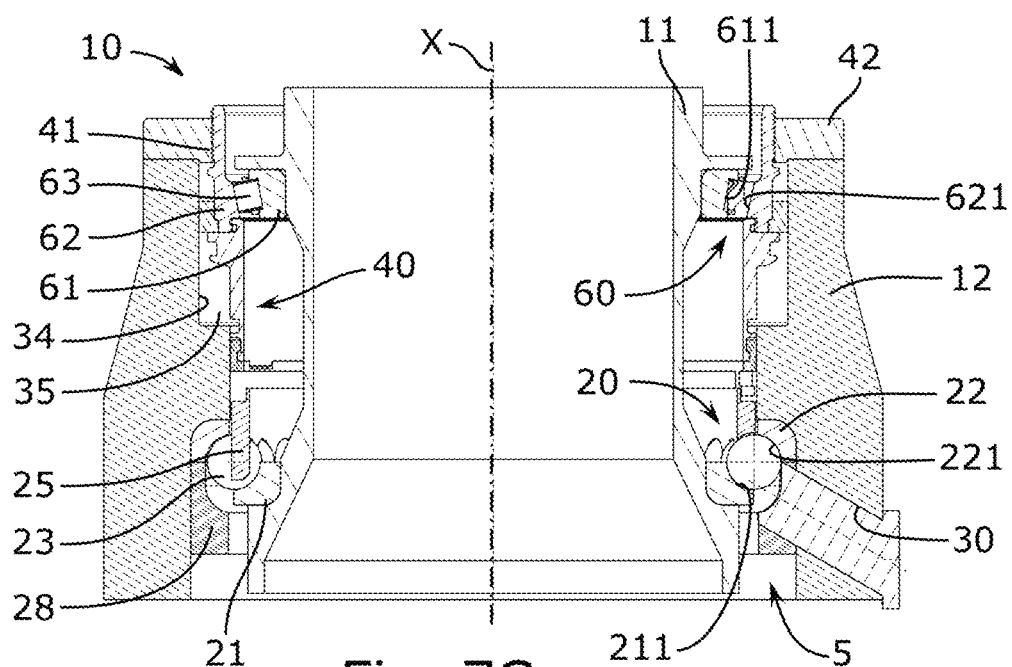
FIG. 7C: a sectional view of an assembly according to this embodiment in rolling position of the bearing and in an uncoupled position of the cage of the bearing.

First of all, the chamber 5 or cavity of the propeller boss 12 is positioned in such a way that its main axis X is vertical, with the orientation illustrated in the figures, notably FIGS. 7A, 7B and 7C.

Next, the operator axially unlocks the first mechanical sub-assembly 11 with respect to the second mechanical sub-assembly 12 by unscrewing the locking flange 42 from its anchoring on the threading 41, which has the effect, in the absence of pressure in the variable volume chamber, of allowing the blade root 11 to be displaced under the effect of its own weight, and to move apart the bearing races 211, 221 opposite the ball 23 bearing 20. To avoid any risk of the blade falling out during dismantling or any excessive force by maintenance personnel, the hydraulic device described previously could obviously be employed to support the weight of the blade during the relative displacement of the races 211 and 221. In other words, the first sub-assembly 11 is displaced axially along the reference axis X with respect to the second sub-assembly 12 in the sense of axially moving away the first ring 21 with respect to the second ring 22 of the bearing 20. This moving away has the consequence of eliminating the load on the rolling bodies 23. The load on the rolling bodies 63 is also eliminated at the same time.

At the end of travel of the preceding displacement, the maneuvering member 40 is displaced towards the bearing cage 25 by combining translation along the reference axis X and rotation around this same axis X in the direction D1 until being engaged on its coupling interface 27, in coupling position such that the bearing 20 is in maintenance position wherein the load on the rolling bodies 23 is eliminated. The relative axial displacement of the first sub-assembly 11 with respect to the second sub-assembly 12 and that of the maneuvering member 40 with respect to the bearing cage 25, may be in part concomitant.

The bearing cage 25 is next rotationally displaced in the same predetermined sense D1 around its reference axis X to lead the rolling bodies 23 towards the access channel 30 from where they can escape from the simple effect of their weight and be removed.

During all these maintenance and rolling phases, the cage 25 ensures its function of guiding the rolling bodies 23 thus efficiently avoiding any contact, shock or wear between the rolling bodies 23.

FIGS. 9 to 17 illustrate different embodiments, in particular alternative embodiments of the coupling mechanism 50.

The alternative embodiment, illustrated in FIGS. 9, 10A, 10B, 10C, 12A, 12B and 12C, essentially differs from the embodiment described above in that the cage 25 comprises at least one groove 71 configured to receive the coupling means 47 of the maneuvering member 40, namely here elastic hooks 72 capable of coupling in a detachable manner, and by elastic stress, with said groove 71.

The elastic hooks 72 are distributed on the perimeter of the maneuvering member 40 and each comprises a body 720 extending globally axially, that is to say parallel to the reference axis X, from a base 721 integral with an axial end of the maneuvering member 40, axially opposite its threaded portion 41. Each of the elastic hooks 72 is configured to couple, or cooperate, with the groove 71. Each of the elastic hooks 72 is hinged or elastically flexible substantially at the level of its base 721, for example at the junction of the body 720 of the elastic hook 72 and the maneuvering member 40. Each elastic hook 72 is provided, at its distal end opposite to its base 721, with a fastening head 722 extending at least in part radially, and configured to be housed in the groove 71, the fastening head 722 being elastically stressed in said groove 71 in coupled position. The elastic hooks 72 extend onto the annular perimeter of the cage 25 along predetermined angular sectors, delimiting the width of the hooks, so as to confer on the elastic hooks 72 a certain stiffness.

The groove 71 is borne by the socket 250 of the cage 25 and extends along an annular shell with respect to the reference axis X, preferably circumferential with respect to the cage 25, and has an opening 710 oriented radially outwards with respect to the reference axis X. An axial coupling of the maneuvering member 40 with the bearing cage 25, that is to say a translational coupling, is ensured by the elastic attachment of the elastic hooks 72 in the associated groove(s) 71.

The groove 71 is bordered, on the axial side which translationally receives the elastic hooks 72, by a projection 711 extending along an annular shell. This projection 711 comprises, on its exterior side axially opposite the interior side delimiting the groove 71, a guiding wall such as a chamfer 712 making it possible, during the coupling of the coupling mechanism 50, to guide the elastic hooks 72 during their coupling trajectory, in addition to centring the maneuvering member 40 with respect to the cage 25 during this operation, while ensuring the progressive widening of the elastic hooks 72, that is to say their elastic deformation, up to their cooperation in the groove 71. In this way, the fastening head 722 at the distal end of each of the elastic hooks 72 is displaced radially and elastically under the effect of the inflexion of the associated elastic hook 72 by sliding on said chamfer 712 to be housed at the end of trajectory in the groove 71 and ensure the function of elastic attachment or axial snap fitting. The projection 711 thus forms a stop notch for the coupled position of the two parts, when the elastic hooks 72 are housed in the groove 71 to avoid its inadvertent uncoupling, uncoupling being however possible by exerting a sufficient predetermined stress, notably at least equal to the snap fitting force, translationally in the sense of moving apart the two parts. The groove 71 has a bottom extending along a shell continuous on its circumference, and of which each section is identical to all the others, such that once translationally coupled with the cage 25, after the movement of translation carried out, the maneuvering member 40 may be pivoted.

To limit the relative axial translation of the maneuvering member 40 with respect to the cage 25, all or part of the elastic hooks comprise, for example at the level of their body, a protuberance 723 oriented on the side of the part with which they couple, i.e. here inwards, and which are configured to form an axial stop capable of receiving the projection 711 axially in abutment. Such a stop may have different configurations: for example the axial protuberance 723 may be integral with the maneuvering member 40 and configured to receive in abutment an axial end 254 of the part that bears the groove 71, since the cage 25 or another protuberance 713 may border the groove 71, on the other side axially of the projection 711 and configured to receive in axial abutment an axial end of the elastic hooks 72 (see for example FIG. 17A). Obviously, other surfaces may entirely be used to form such a relative axial stop between the two parts.

An angular coupling of the maneuvering member 40 with the bearing cage 25, that is to say a rotational coupling, is ensured by the elastic attachment of at least one elastic hook 72 in a corresponding recess 73. The recess 73 is radially open on the same side, here exterior, as the groove 71 and is configured such that, when an elastic hook 72 is placed radially facing the recess 73, said elastic hook may return to its rest position, without deformation, to penetrate into this recess 73 and rotationally connect the cage 25 to the maneuvering member 40, in the manner of a cotter. The recess 73 extends along an angular sector greater than an angular sector of one of the elastic hooks 72. In this way, the width of an elastic hook 72 being smaller than the width of the recess 73, it can be housed therein. The angular sector of the recess 73 is delimited by two side edges 731 each substantially contained in planes containing the reference axis X. The recess 73 corresponds at least to a local discontinuity in the projection 711, but may extend in a more or less consequent manner over all or part of the section of the socket 250, such that the angular side edges 731 of the recess 73 each correspond at least to a slice of this projection 711 up to the whole of the section of the socket 250. In coupled position, each elastic hook 72 is resting against the groove 71, this resting being able to be localised at the level of the fastening heads 722 against the bottom of the associated groove and/or at the level of the body 720 of the elastic hook 72 against the projection 711. The recess 73 is configured such that at least one elastic hook 72 can be housed therein in a state of elastic stress lower than in the groove 71. In this way, after a relative rotation of the maneuvering member 40 with respect to the cage 25, an elastic hook 72 positions itself facing the recess 73, its elastic stress releases and enables the penetration of the elastic hook 72 between the two side edges 731 which delimits it. By making the movement of relative rotation of the maneuvering member 40 with respect to the cage 25, the hook comes against the side edge 731 placed on its path and rotationally drives the cage 25.

In a complementary or alternative manner, the recess 73 may have locally a radial depth greater than a radial depth of the groove 71, up to being a through recess in the thickness of the part (see for example the embodiments of FIGS. 13A, 13B and 13C, and 16A, 16B and 16C).

Once translationally coupled with the cage 25, the maneuvering member 40 may then be pivoted until one of the suitable elastic hooks 72 penetrates by elastic return into the recess 73 where a section of the associated elastic hook 72 comes in lateral abutment against one of the side edges 731 of the recess 73. The recess 73 receiving the elastic hook 72 called "anti-rotation" is thus occupied following a simple rotation of at the most a width of hook 72 of the maneuvering member 40, thus under the simple effect of the return to the undeformed position of said hook, or in a position at least of lowest deformation corresponding to a position of least stress with respect to the stress in the groove 71.

In this way, the bearing cage 25 is capable of being rotationally driven by the maneuvering member 40 in a predetermined direction with respect to the reference axis X. A rotation in the other sense is going, possibly after a travel corresponding to a certain clearance depending on the dimensions, to bring the anti-rotation elastic hook 72 in contact and in abutment against the other of the side edges 731 of the recess 73 such that the bearing cage 25 is capable of being rotationally driven by the maneuvering member 40 in an opposite direction with respect to the reference axis X.

It will be noted that the deformability zone of each of the elastic hooks 72 may be formed by a circular extrusion of its profile with or without recess. The shape and the dimensioning of each of the elastic hooks 72 make it possible to favour a zone of elastic deformability of said elastic hooks 72.

To uncouple or to separate the two parts, it suffices to carry out simply an axial translation of the maneuvering member 40, with respect to the reference axis X, that is to say a simple movement in a direction of separating the two parts. To ensure this detachable character of the coupling, the projection 711 may, for example, be bordered, on the side interior to the projection 711, or on the side opposite to the guiding wall 712, by another inclined wall so as to guide the elastic hooks 72 during their uncoupling trajectory by ensuring the progressive widening of the elastic hooks 72 when a predetermined force is applied on the maneuvering member 40 tending to move apart the two parts 25, 40. The inclination of this wall is chosen so as to be sufficiently important so as not to risk inadvertent uncoupling of the two parts, but sufficiently reduced to enable uncoupling of the two parts from a predetermined force, preferably such that a manual action of an operator can uncouple the two parts without necessitating the use of specific tooling. It will be noted that the function fulfilled by the projection 711 may have a different structure. For example, it is possible to use fastening heads 722 of the elastic hooks 72 configured, notably by their shape, to snap fit onto a shoulder, the coupling being configured for example to guarantee that the snap "unfitting" force is greater than the snap fitting force.

Figure 11:
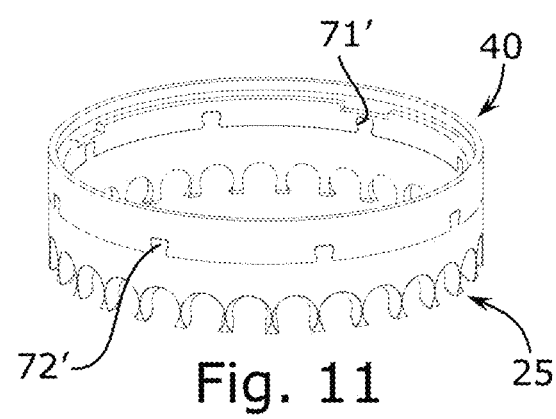
FIG. 11: a perspective view of a cage according to another embodiment, in translationally and rotationally coupled position.
Figure 12A:
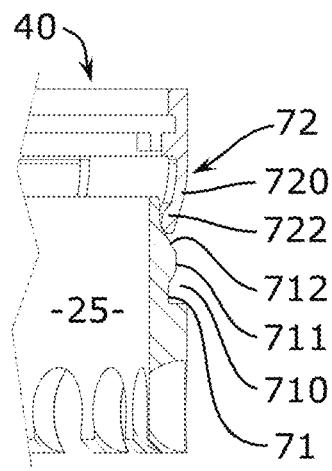
FIG. 12A: a detail, sectional view, of FIG. 10A.
Figure 12B:
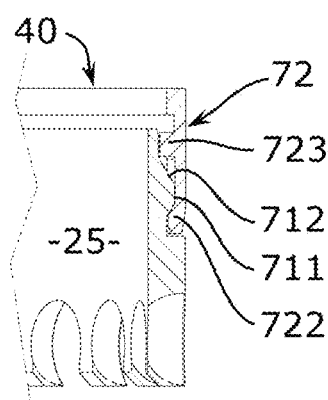
FIG. 12B: a detail, sectional view, of FIG. 10B.
Figure 12C:
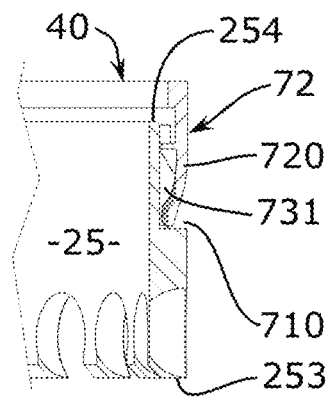
FIG. 12C: a detail, sectional view, of FIG. 10C.

FIG. 11 illustrates a perspective view of a bearing cage 25 according to another embodiment, in translationally, and rotationally, coupled position of the maneuvering member 40 with the cage 25. This embodiment essentially differs from the preceding in that axial projections 72' of the cage 25 are configured to cooperate by elastic deformation in housings 71' formed in the thickness of the maneuvering member 40 and configured to form together a coupling mechanism 50. The opening of the housings 71' to receive the projections 72' is open axially with respect to the reference axis X. To ensure this cooperation by elastic deformation, the axial projections 72' of the cage 25 have side bulges or swellings, which are oriented along the thickness of the socket 250, substantially in a direction perpendicular to the planes containing the reference axis X.

Figure 13A:
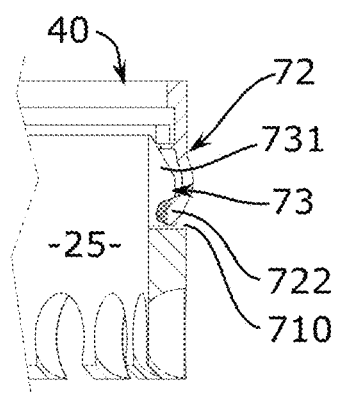
FIG. 13A: an alternative of FIG. 12C.
Figure 13B:
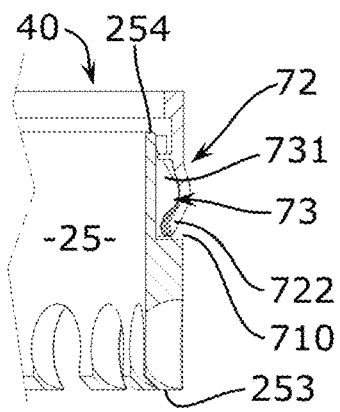
FIG. 13B: a second alternative of FIG. 12C.
Figure 13C:
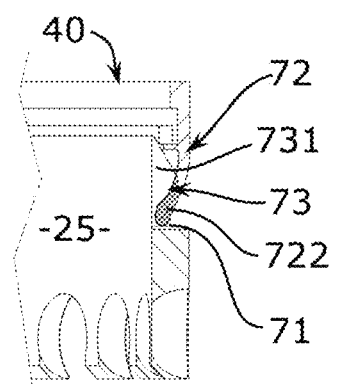
FIG. 13C: a third alternative of FIG. 12C.

The alternatives illustrated in FIGS. 13A, 13B and 13C relate to different embodiments where anti-rotation elastic hooks 72 are visible in an associated recess 73, the elastic hooks 72 having shapes and dimensions which differ for each of them. Thus for example, the elastic hook 72 may have a substantially curved shape, or even with a bent zone for better control of the pressure force, as illustrated in FIGS. 13A and 13B, or conversely be more inclined inwards to increase the coverage of the section of the elastic hook with the faces 731, as illustrated in FIG. 13C.

Generally speaking, it will be noted that the shape of the elastic hooks 72 is designed to enable:
 a sufficient snap fitting force for mounting and/or maintenance operations;
 a snap unfitting force without deterioration of the elastic hook 72 under the effect of the removal of the bearing cage 25; and
 a sufficient resistance to drive the bearing cage 25 and its ring of balls 23 in the configuration where the force opposing the desired rotation is the highest, this while taking account of a potential safety coefficient.

Figure 14A:
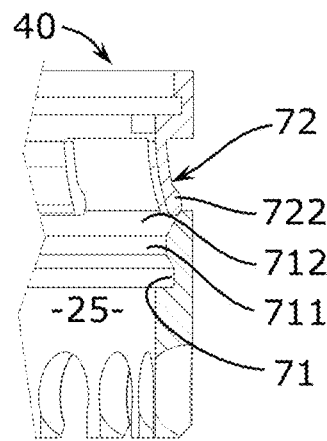
FIG. 14A: a detail, sectional view, of a bearing cage and a maneuvering member according to another embodiment in uncoupled position.
Figure 14B:
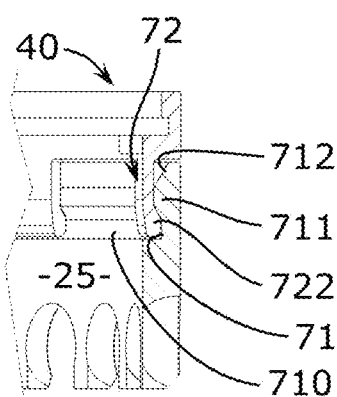
FIG. 14B: a detail, sectional view, of a bearing cage and a maneuvering member according to the embodiment of FIG. 14A, in translationally coupled position.
Figure 14C:
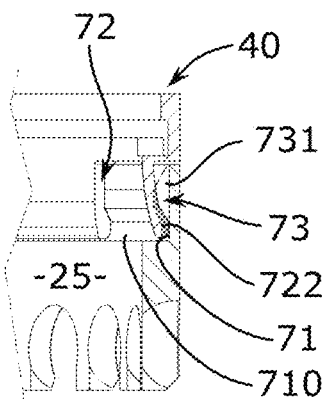
FIG. 14C: a detail, sectional view, of a bearing cage and a maneuvering member according to the embodiment of FIG. 14A, in rotationally coupled position.

FIGS. 14A, 14B and 14C illustrate a detail, sectional view, of a bearing cage 25 and a maneuvering member 40 according to another embodiment, respectively in uncoupled (FIG. 14A), translationally coupled (FIG. 14B) and translationally and rotationally coupled (FIG. 14C) position.

This embodiment essentially differs from the preceding embodiments described in that the elastic hooks 72 have a fastening head 722 extending radially outwards, and configured to be housed in the groove 71 of which the opening 710 is oriented inwards. Like the groove 71, the projection 711 is projecting inwards. In this way, the elastic hooks 72 of the maneuvering member 40 thus comes to slide into the radially interior space of the socket 250. The coupling of the elastic hooks 72 in the groove enables an interior snap fitting.

Figure 15A:
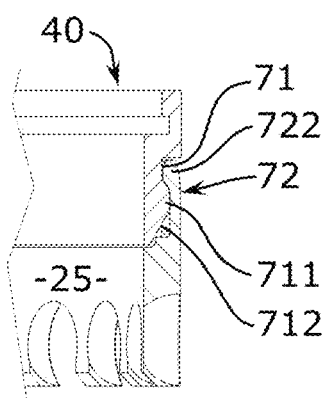
FIG. 15A: a detail, sectional view, of a bearing cage and a maneuvering member according to another embodiment, in translationally coupled position.
Figure 15B:
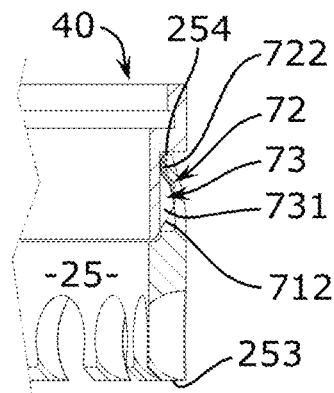
FIG. 15B: a detail, sectional view, of a bearing cage and a maneuvering member according to the embodiment of FIG. 15A, in rotationally coupled position.

The embodiment illustrated in FIGS. 15A and 15B, represents an alternative embodiment which essentially differs from the embodiments described previously in that the elastic hooks 72 of the coupling mechanism 50 are integral with the cage 25 and the groove 71 and integral with the maneuvering member 40.

Figure 16A:
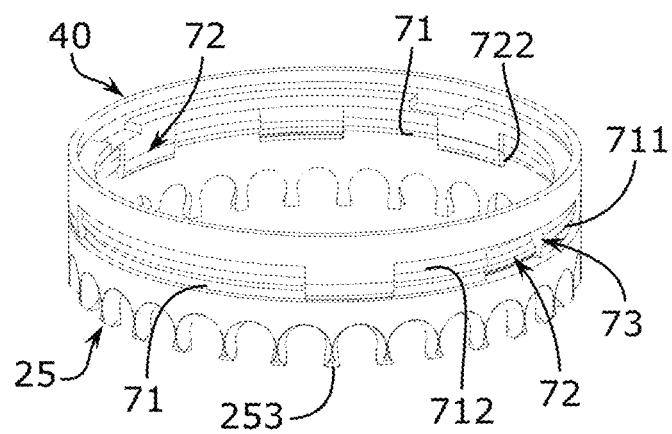
FIG. 16A: a perspective view of a cage and a portion of a maneuvering member according to another embodiment, in translationally and rotationally coupled position.
Figure 16B:
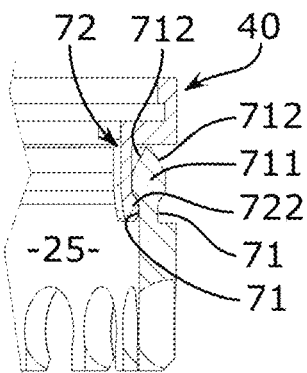
FIG. 16B: a detail, sectional view, of a bearing cage and a maneuvering member according to the embodiment of FIG. 16A, in translationally coupled position.
Figure 16C:
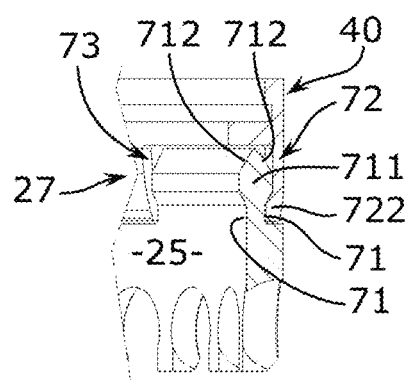
FIG. 16C: a detail, sectional view, of a bearing cage and a maneuvering member according to the embodiment of FIG. 16A, in translationally and rotationally coupled position.

The embodiment illustrated in FIGS. 16A, 16B and 16C, represents an alternative embodiment which essentially differs from the embodiments described previously in that the coupling mechanism 50 comprises interior and exterior elastic hooks 72, in an alternate manner on the perimeter so as to ensure coupling of said interior and exterior elastic hooks 72 respectively in an interior groove and an exterior groove of the socket 250. In this way, the elastic hooks 72 are snapped on alternately by the interior then by the exterior. The recess 73 is here radially passing through the wall of the bearing cage 25 such that rotational coupling may be achieved without distinction by one of the interior or exterior elastic hooks 72.

Figure 17A:
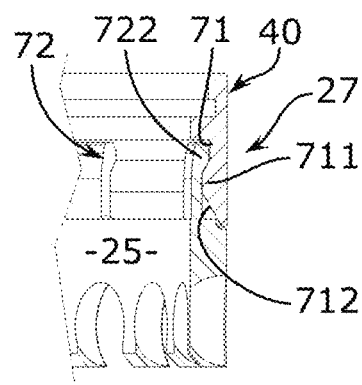
FIG. 17A: a detail, sectional view, of a bearing cage and a maneuvering member according to another embodiment, in translationally coupled position.
Figure 17B:
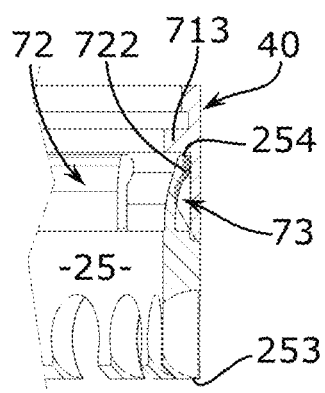
FIG. 17B: a detail, sectional view, of a bearing cage and a maneuvering member according to the embodiment of FIG. 17A, in rotationally coupled position.

The embodiment illustrated in FIGS. 17A and 17B represents an alternative which essentially differs from the embodiment described with reference to FIGS. 15A and 15B, in that the coupling of the elastic hooks 72 in the groove enables snap fitting by the interior.

Naturally, the invention is described in the preceding as an example. It is understood that those skilled in the art are able to realise different alternative embodiments of the invention without however going beyond the scope of the invention.

For example, the coupling mechanism 50 formed in the first embodiments described by the cooperation of the coupling means 47 of the maneuvering member 40 comprising jaw clutching legs 470, with the coupling interface 27 comprising the grooves 270 of the bearing cage 25, may have different structures to ensure the same function. Ferromagnetic coupling means may for example also be used as a replacement or as a complement. Other coupling means according to an embodiment may also comprise splines. In these two cases, the coupling of the coupling means 47 of the maneuvering member 40 with the coupling interface 27 of the cage 25 may be carried out by a simple translation along the reference axis X.

The chamfer 712 making it possible, during coupling of the coupling mechanism 50, to facilitate elastic attachment by forming surfaces for guiding the elastic hooks, may have another shape such as for example a surface of a connector spoke of circular or elliptical profile for example.

The hydraulic jack constituted by the maneuvering member forming piston and the variable volume chamber constituted in the staged chamber 5 of the propeller boss 12 may if appropriate be replaced by any other type of actuator, of which the energy source may be hydraulic, pneumatic or electric, for example an endless screw motorised actuator.

The invention claimed is:

1. A bearing cage for a bearing comprising a first ring having a first bearing race, a second ring having a second bearing race, and rolling bodies positioned in an annular rolling volume between the first and the second bearing races in such a way as to enable a relative rotation between the first and second rings around a reference axis of the bearing, wherein the bearing cage comprises:
cells each for housing an associated one of the rolling bodies, and
an interface for coupling the bearing cage with a manoeuvring member, such that when the manoeuvring member is engaged with the interface, the bearing cage is capable of being rotationally driven by the manoeuvring member in a predetermined direction with respect to the reference axis,
wherein the cells are shaped so as not to retain the rolling bodies radially at least along a radial centrifugal direction such that the rolling bodies can escape radially from the cells under the effect of gravity.

2. The bearing cage of claim 1, wherein the interface is configured to ensure a detachable coupling.

3. The bearing cage of claim 1, wherein each of the cells is configured to shroud the associated one of the rolling bodies so as to maintain the associated one of the rolling bodies axially and maintain the bearing cage in an operational position during operating phases.

4. The bearing cage of claim 1, further comprising
an annular socket from which separations extend axially to delimit the cells, and
openings formed on a frontal face of the bearing cage opposite the annular socket.

5. The bearing cage of claim 4, wherein the socket has an axial end, axially opposite the frontal face, comprising a revolution profile configured to ensure a centring of the manoeuvring member.

6. The bearing cage of claim 4, wherein a frontal face of the bearing cage comprises at least one chamfer situated radially inwards.

7. The bearing cage of claim 1, wherein each cell has a contact surface configured to be locally complementary to the associated one of the rolling bodies.

8. The bearing cage of claim 7, wherein the contact surface extends onto a spherical shell portion.

9. The bearing cage of claim 1, wherein the interface comprises at least a first of two coupling interfaces, one consisting of elastic hooks and the other consisting of at least one groove, the first of the two coupling interfaces being configured to be engaged, to cooperate, by elastic attachment with a second of the two coupling interfaces borne by the manoeuvring member.

10. The bearing cage of claim 9, wherein the groove is bordered on a side receiving the elastic hooks during coupling by a radial projection, the radial projection comprising a guiding wall for guiding the elastic hooks.

11. The bearing cage of claim 10, wherein the guiding wall is configured to guide the manoeuvring member towards a centred position with respect to the bearing cage.

12. A rolling bearing comprising
a first ring having a first bearing race,
a second ring having a second bearing race,
rolling bodies positioned in an annular rolling volume between the first and second bearing races in such a way as to enable a relative rotation between the first and second rings around a reference axis of the bearing, and
a bearing cage comprising cells each for housing an associated one of the rolling bodies, and an interface for coupling the bearing cage with a manoeuvring member, such that when the manoeuvring member is engaged with the interface, the bearing cage is capable of being rotationally driven by the manoeuvring member in a predetermined direction with respect to the reference axis,
wherein the first ring is at least axially moveable with respect to the second ring, between a rolling position of the rolling bodies on the first and second bearing races and a maintenance position wherein a load supported by the rolling bodies is eliminated.

13. The bearing of claim 12, wherein the rolling bodies are balls.

14. An assembly comprising:
a first mechanical sub-assembly,
a second mechanical sub-assembly,
a bearing comprising a first ring having a first bearing race, a second ring having a second bearing race, the first ring being integral with the first mechanical sub-assembly and the second ring being integral with the second mechanical sub-assembly, rolling bodies positioned in an annular rolling volume between the first and the second bearing races in such a way as to enable a relative rotation between the first and second rings around a reference axis of the bearing, and a bearing cage comprising cells for housing the rolling bodies, wherein the bearing cage comprises a coupling interface, the first ring being moveable with respect to the second ring between a rolling position of the rolling bodies on the first and second bearing races and a maintenance position wherein a load supported by the rolling bodies is eliminated,
a manoeuvring member, which, in a coupling position of the assembly, is engaged with the coupling interface, such that the bearing cage is capable of being rotationally driven by the manoeuvring member in a predetermined direction with respect to the reference axis, and
an access channel placing the external environment in communication with the annular rolling volume, the access channel having an inner section enabling at least the passage of the rolling bodies.

15. The assembly of claim 14, wherein the first mechanical sub-assembly is configured to be displaced axially with respect to the second mechanical sub-assembly in such a way that a distance between the first and the second bearing races is modifiable.

16. The assembly of claim 14, wherein the manoeuvring member is configured to contribute to the axial locking of the first mechanical sub-assembly with respect to the second mechanical sub-assembly, notably the first ring with respect to the second ring, in rolling position.

17. The assembly of claim 14, wherein the bearing cage and the manoeuvring member comprise a coupling mechanism movable between a coupling position where a coupling interface of the manoeuvring member is engaged with the coupling interface of the bearing cage in such a way that a rotational displacement of the manoeuvring member in the predetermined direction with respect to the reference axis drives a displacement of the bearing cage, and an uncoupled position enabling a displacement of the manoeuvring member to lock the first ring axially with respect to the second ring in the rolling position.

18. The assembly of claim 17, wherein the coupling mechanism comprises elastic hooks configured to be engaged under elastic stress in at least one groove forming the coupling interface of the bearing cage.

19. The assembly of claim 14, wherein the manoeuvring member is accessible from outside the first and second mechanical sub-assemblies.

20. The assembly of claim 14, wherein the manoeuvring member has a fastening device, configured to receive a locking device, through a tapped bore, the locking device is maintained in abutment against the second mechanical sub-assembly in rolling position to axially lock the second mechanical sub-assembly with respect to the locking device.

21. The assembly of claim 14, wherein the first mechanical sub-assembly is a rotating shaft, of which a first end is supported in rolling position by the second mechanical sub-assembly.

22. The assembly of claim 21, wherein the first mechanical sub-assembly is a blade root of a propeller with variable pitch angle, and the second mechanical sub-assembly is a rotating boss of the propeller.

23. A method for mounting the assembly of claim 14, comprising the following steps:
putting in place the bearing cage in the coupling position with the manoeuvring member around the first mechanical sub-assembly;
putting in place a temporary assembly formed by the first mechanical sub-assembly, the bearing cage and the manoeuvring member with respect to the second mechanical sub-assembly, the bearing being placed in the maintenance position;
opening the access channel in such a way that the rolling bodies can pass through the access channel to enter or be positioned in the cells while the bearing cage rotates in the predetermined direction;
disengaging the bearing cage and the manoeuvring member, displacing the manoeuvring member, and effecting a relative displacement of the first mechanical sub-assembly with respect to the second mechanical sub-assembly, up to the rolling position of the assembly;
axially locking the first mechanical sub-assembly with respect to the second mechanical sub-assembly, in the rolling position.

24. A method of dismantling or maintaining the assembly of claim 14, comprising the following steps:
axially unlocking the first mechanical sub-assembly with respect to the second mechanical sub-assembly;
displacing the manoeuvring member to the bearing cage to engage the coupling interface of the bearing cage, in the coupling position such that the bearing is brought into the maintenance position;
rotating the bearing cage in the predetermined direction to lead the rolling bodies towards the access channel.

* * * * *